US008560381B2

(12) United States Patent
Green et al.

(10) Patent No.: US 8,560,381 B2
(45) Date of Patent: Oct. 15, 2013

(54) SYSTEM AND METHOD FOR ELECTIONS AND GOVERNMENT ACCOUNTABILITY

(76) Inventors: Robert Green, Crescent Springs, KY (US); Alec Green, Colorado Springs, CO (US)

( * ) Notice: Subject to any disclaimer, the term of this patent is extended or adjusted under 35 U.S.C. 154(b) by 0 days.

(21) Appl. No.: 13/376,436

(22) PCT Filed: Jun. 24, 2010

(86) PCT No.: PCT/US2010/039804
§ 371 (c)(1),
(2), (4) Date: Dec. 6, 2011

(87) PCT Pub. No.: WO2010/151658
PCT Pub. Date: Dec. 29, 2010

(65) Prior Publication Data

US 2013/0006719 A1 Jan. 3, 2013

Related U.S. Application Data

(60) Provisional application No. 61/219,954, filed on Jun. 24, 2009.

(51) Int. Cl.
*G06Q 10/00* (2012.01)
*G06F 21/00* (2013.01)

(52) U.S. Cl.
USPC .................. 705/12; 705/16; 705/31; 705/59; 380/262; 380/279; 380/281

(58) Field of Classification Search
USPC .............. 705/12, 16, 21, 59, 71; 380/44, 262, 380/278, 279
See application file for complete search history.

(56) References Cited

U.S. PATENT DOCUMENTS 5,189,288 A 2/1993 Anno et al.
5,218,528 A 6/1993 Wise et al.
5,412,727 A 5/1995 Drexler et al.
6,081,793 A 6/2000 Challener et al.
6,540,138 B2 4/2003 Hall et al.

(Continued)

FOREIGN PATENT DOCUMENTS

WO 2007/006526 A1 1/2007

OTHER PUBLICATIONS

European Patent Office, International Search Report and Written Opinion in corresponding International Application No. PCT/US2010/039804 mailed Sep. 2, 2010, 12 pp.

*Primary Examiner* — Dante Ravetti
(74) *Attorney, Agent, or Firm* — Wood, Herron & Evans, LLP

(57) ABSTRACT

A method for a voter to vote using an electoral system. An electoral system includes a computing system for accessing a database having first and second data sets correlated to a roster of eligible voters and to a voting record that is associated with each of those eligible voters. The method of voting includes the voter providing indentifying information, which causes the computing system to verify that the voter is on the roster of eligible voters and eligible to vote in the election. The voter interacts with the computing system to cast a preliminary vote and then commits the preliminary vote. The voter may also interact with the computing system to perform a government accountability program in which elected officials may be voted on for sanctions or removal from office when the elected official has lost the confidence of the associated electoral district.

14 Claims, 17 Drawing Sheets

(56) References Cited

U.S. PATENT DOCUMENTS

| | | | |
|---|---|---|---|
| 6,769,613 B2 | 8/2004 | McDermott et al. | |
| 7,036,730 B2 | 5/2006 | Chung | |
| 7,077,314 B2 | 7/2006 | Johnson | |
| 7,197,167 B2 | 3/2007 | Chung et al. | |
| 7,243,846 B2 | 7/2007 | Reardon | |
| 7,497,377 B2 | 3/2009 | Watson | |
| 7,549,049 B2 | 6/2009 | Bogasky et al. | |
| 2001/0029463 A1 | 10/2001 | Fuller | |
| 2002/0138341 A1 | 9/2002 | Rodriguez et al. | |
| 2006/0289638 A1 | 12/2006 | Schilling | |
| 2007/0106552 A1 | 5/2007 | Matos | |
| 2007/0192176 A1* | 8/2007 | Onischuk | 705/12 |
| 2007/0233552 A1 | 10/2007 | Maggio | |
| 2009/0079538 A1 | 3/2009 | Fein et al. | |
| 2009/0149155 A1* | 6/2009 | Grossman | 455/411 |
| 2009/0173777 A1 | 7/2009 | Ward | |
| 2011/0145150 A1* | 6/2011 | Onischuk | 705/50 |

* cited by examiner

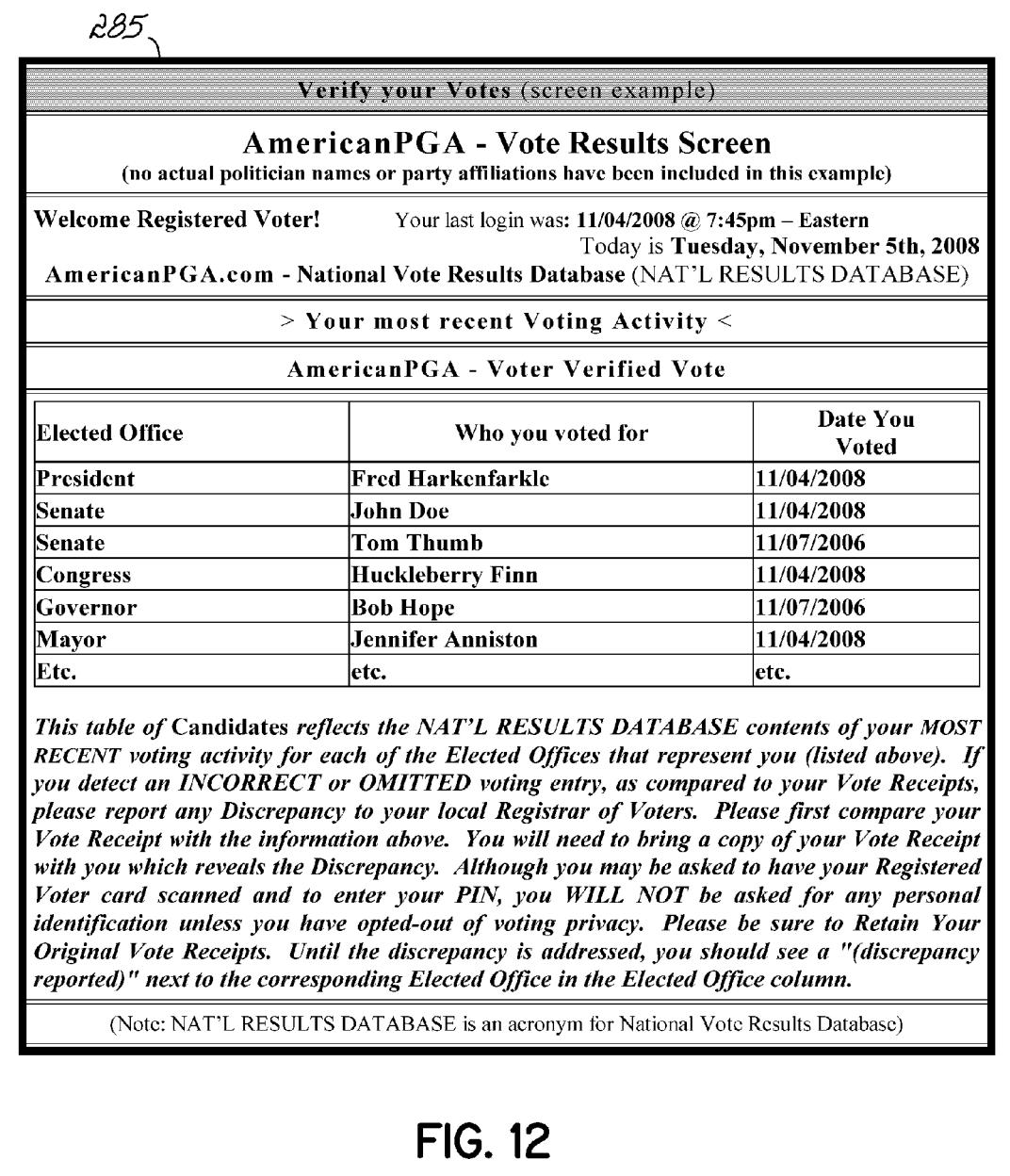

285

Verify your Votes (screen example)

AmericanPGA - Vote Results Screen

(no actual politician names or party affiliations have been included in this example)

Welcome Registered Voter! Your last login was: 11/04/2008 @ 7:45pm – Eastern

Today is Tuesday, November 5th, 2008

AmericanPGA.com - National Vote Results Database (NAT'L RESULTS DATABASE)

> Your most recent Voting Activity <

AmericanPGA - Voter Verified Vote

| Elected Office | Who you voted for | Date You Voted |
|---|---|---|
| President | Fred Harkenfarkle | 11/04/2008 |
| Senate | John Doe | 11/04/2008 |
| Senate | Tom Thumb | 11/07/2006 |
| Congress | Huckleberry Finn | 11/04/2008 |
| Governor | Bob Hope | 11/07/2006 |
| Mayor | Jennifer Anniston | 11/04/2008 |
| Etc. | etc. | etc. |

*This table of* Candidates *reflects the NAT'L RESULTS DATABASE contents of your MOST RECENT voting activity for each of the Elected Offices that represent you (listed above). If you detect an INCORRECT or OMITTED voting entry, as compared to your Vote Receipts, please report any Discrepancy to your local Registrar of Voters. Please first compare your Vote Receipt with the information above. You will need to bring a copy of your Vote Receipt with you which reveals the Discrepancy. Although you may be asked to have your Registered Voter card scanned and to enter your PIN, you WILL NOT be asked for any personal identification unless you have opted-out of voting privacy. Please be sure to Retain Your Original Vote Receipts. Until the discrepancy is addressed, you should see a "(discrepancy reported)" next to the corresponding Elected Office in the Elected Office column.*

(Note: NAT'L RESULTS DATABASE is an acronym for National Vote Results Database)

FIG. 12

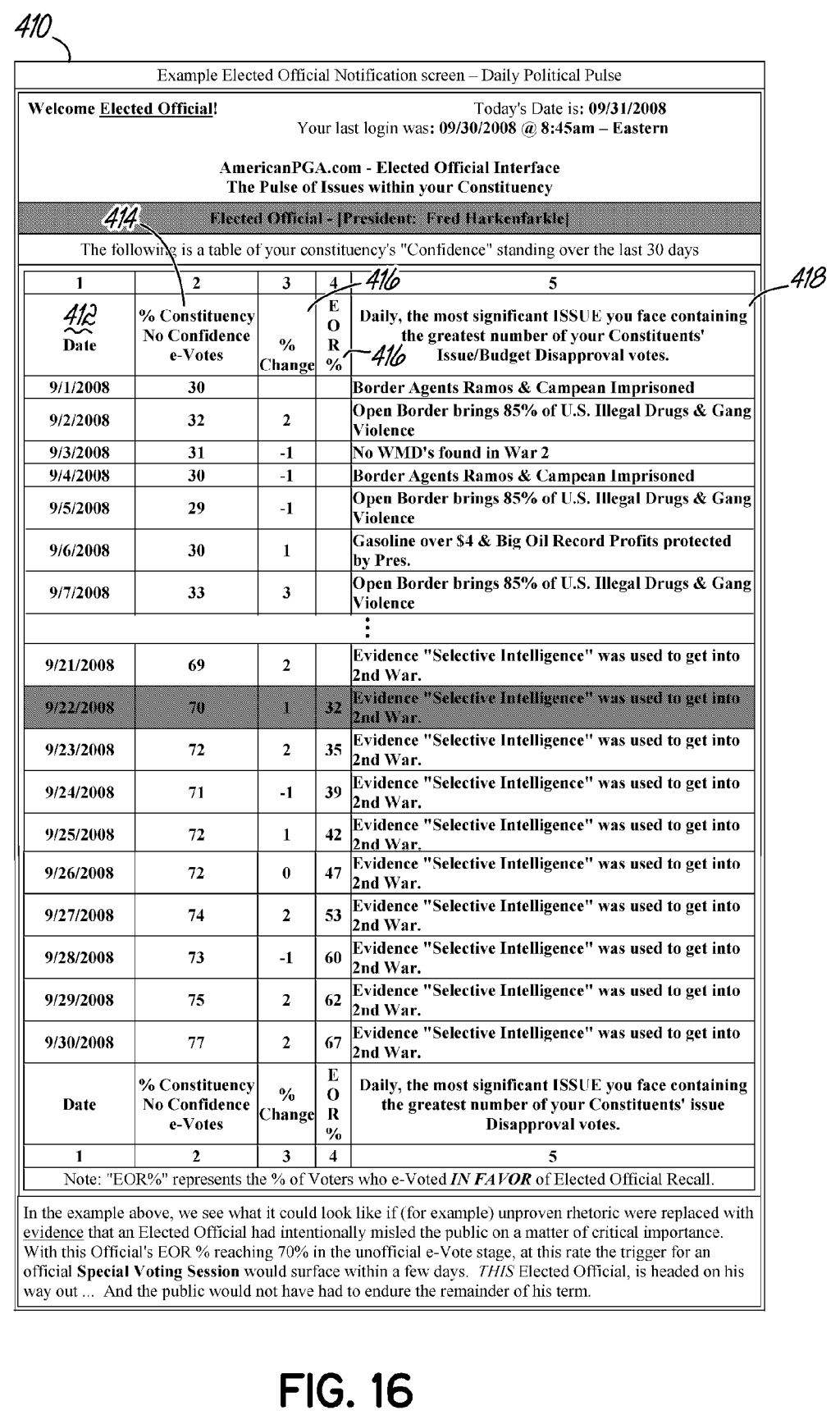

410

Example Elected Official Notification screen – Daily Political Pulse

Welcome Elected Official! Today's Date is: 09/31/2008
Your last login was: 09/30/2008 @ 8:45am – Eastern

AmericanPGA.com - Elected Official Interface
The Pulse of Issues within your Constituency

Elected Official - [President: Fred Harkenfarkle]

414

The following is a table of your constituency's "Confidence" standing over the last 30 days 416 418

| 1 | 2 | 3 | 4 | 5 |
|---|---|---|---|---|
| 412 Date | % Constituency No Confidence e-Votes | % Change | EOR % (416) | Daily, the most significant ISSUE you face containing the greatest number of your Constituents' Issue/Budget Disapproval votes. |
| 9/1/2008 | 30 | | | Border Agents Ramos & Campean Imprisoned |
| 9/2/2008 | 32 | 2 | | Open Border brings 85% of U.S. Illegal Drugs & Gang Violence |
| 9/3/2008 | 31 | -1 | | No WMD's found in War 2 |
| 9/4/2008 | 30 | -1 | | Border Agents Ramos & Campean Imprisoned |
| 9/5/2008 | 29 | -1 | | Open Border brings 85% of U.S. Illegal Drugs & Gang Violence |
| 9/6/2008 | 30 | 1 | | Gasoline over $4 & Big Oil Record Profits protected by Pres. |
| 9/7/2008 | 33 | 3 | | Open Border brings 85% of U.S. Illegal Drugs & Gang Violence |
| ⋮ | | | | |
| 9/21/2008 | 69 | 2 | | Evidence "Selective Intelligence" was used to get into 2nd War. |
| 9/22/2008 | 70 | 1 | 32 | Evidence "Selective Intelligence" was used to get into 2nd War. |
| 9/23/2008 | 72 | 2 | 35 | Evidence "Selective Intelligence" was used to get into 2nd War. |
| 9/24/2008 | 71 | -1 | 39 | Evidence "Selective Intelligence" was used to get into 2nd War. |
| 9/25/2008 | 72 | 1 | 42 | Evidence "Selective Intelligence" was used to get into 2nd War. |
| 9/26/2008 | 72 | 0 | 47 | Evidence "Selective Intelligence" was used to get into 2nd War. |
| 9/27/2008 | 74 | 2 | 53 | Evidence "Selective Intelligence" was used to get into 2nd War. |
| 9/28/2008 | 73 | -1 | 60 | Evidence "Selective Intelligence" was used to get into 2nd War. |
| 9/29/2008 | 75 | 2 | 62 | Evidence "Selective Intelligence" was used to get into 2nd War. |
| 9/30/2008 | 77 | 2 | 67 | Evidence "Selective Intelligence" was used to get into 2nd War. |
| Date | % Constituency No Confidence e-Votes | % Change | EOR % | Daily, the most significant ISSUE you face containing the greatest number of your Constituents' issue Disapproval votes. |
| 1 | 2 | 3 | 4 | 5 |

Note: "EOR%" represents the % of Voters who e-Voted *IN FAVOR* of Elected Official Recall.

In the example above, we see what it could look like if (for example) unproven rhetoric were replaced with evidence that an Elected Official had intentionally misled the public on a matter of critical importance. With this Official's EOR % reaching 70% in the unofficial e-Vote stage, at this rate the trigger for an official Special Voting Session would surface within a few days. *THIS* Elected Official, is headed on his way out ... And the public would not have had to endure the remainder of his term.

FIG. 16

SYSTEM AND METHOD FOR ELECTIONS AND GOVERNMENT ACCOUNTABILITY

CROSS-REFERENCE TO RELATED APPLICATIONS

This application claims priority to U.S. Patent Provisional Application No. 61/219,954, entitled METHOD OF VOTING and filed Jun. 24, 2009, the disclosure of which is incorporated herein by reference, in its entirety. This application also claims priority to International Application No. PCT/US2010/039804, entitled A SYSTEM AND METHOD FOR ELECTIONS AND GOVERNMENT ACCOUTABILITY and filed June 24, 2010.

TECHNICAL FIELD

The present invention relates generally to electoral systems, and more specifically, to electoral systems that include a computing system.

BACKGROUND

A representative democracy is a form of government whereby the citizens of sovereign entity elects representatives, from amoungst themselves, to operate that government. The Constitution of the United States establishes one such representative democracy. The powers of an office within that government may be limited by the Constitution.

Further, in the United States, an individual's right to vote in an election is determined by both the federal and state governments: the federal government determines citizenship while the individual states determine the individual's right to vote within a particular jurisdiction.

There has been an exceedingly growing perception that elected officials are not considering the U.S. citizens' interests when fulfilling these official duties as an elected official. Further, there has been wide spread reporting of voter disfranchisement and voter fraud. This has led to a progression of mistrust in the citizenry's perception of the government. Yet, the current system does not allow for the U.S. citizen, outside regularly schedule elections, to provide opinions and/or feedback on the elected official's performance or to remove an individual from the office if gross misuse of the elected office has occurred.

As a result, it would be of great benefit to our republic to include an electoral system that: (1) provides the eligible voter with the ability to review and verify their prior voting history; (2) provides a concise, unambiguous venue through which the eligible voter may provide quantitative responses/feedback to their elected official; (3) provides the eligible voter with an e-vote power that is not limited to Election Day; (4) provides a manner of limiting, suspending, or removing the elected official's privileges associated with the elected office; and (5) provides a manner by which the limiting, suspending, or removing of the elected official's privileges in the case of a true matter of National Security may be overridden by government intervention.

SUMMARY

One illustrative embodiment of the present invention is directed to a method by which a voter uses an electoral system to vote. The electoral system includes a computing system for accessing a database having first and second data sets. The first data set is correlated to a roster of eligible voters; the second data set is correlated to a voting record that is associated with each of those eligible voters. The method of voting includes the voter providing indentifying information, which causes the computing system to verify that the voter is on the roster of eligible voters and eligible to vote in the election. The voter interacts with the computing system to cast a preliminary vote and then commits the preliminary vote. When the preliminary vote is committed, the computing system records an information indicative of the preliminary vote and updates the voting record in the second data set associated with the particular voter.

In another illustrative embodiment, the present invention is directed to an electoral system with the computing system having an interface to access a database. The database includes first, second, third, and fourth data sets. The first data set correlates to a roster of eligible voters; the second data set correlates to a voting record of each of the eligible voters. The second data set may be updated with information indicative of a vote cast. The third data set correlates to a roster of candidates that are seeking election to an office within an electoral district. The fourth data set correlates to the elected official in the office and a record of an action taken by any of the elected officials in his official capacity.

In yet another illustrative embodiment, the present invention is directed to a method of lobbying the enactment of legislation. The method includes the recruiting of candidates to sign a contract with an entity that desires the legislation. The contract would require the candidate to sponsor a bill that would enact the legislation in exchange for the endorsing and promoting of the candidate during an election. The recruiting, endorsing, and promoting will continue until a majority of the seats to an elected office is occupied by signing candidates, thereby facilitating the enacting of the legislation.

BRIEF DESCRIPTION OF THE DRAWINGS

FIG. 12 is a print summary page screen capture from the website for accessing the voter computing system of the electoral system.

FIG. 16 is an Elected Office page screen capture from the website for accessing the voter computing system of the electoral system.

DETAILED DESCRIPTION

Figure 1:
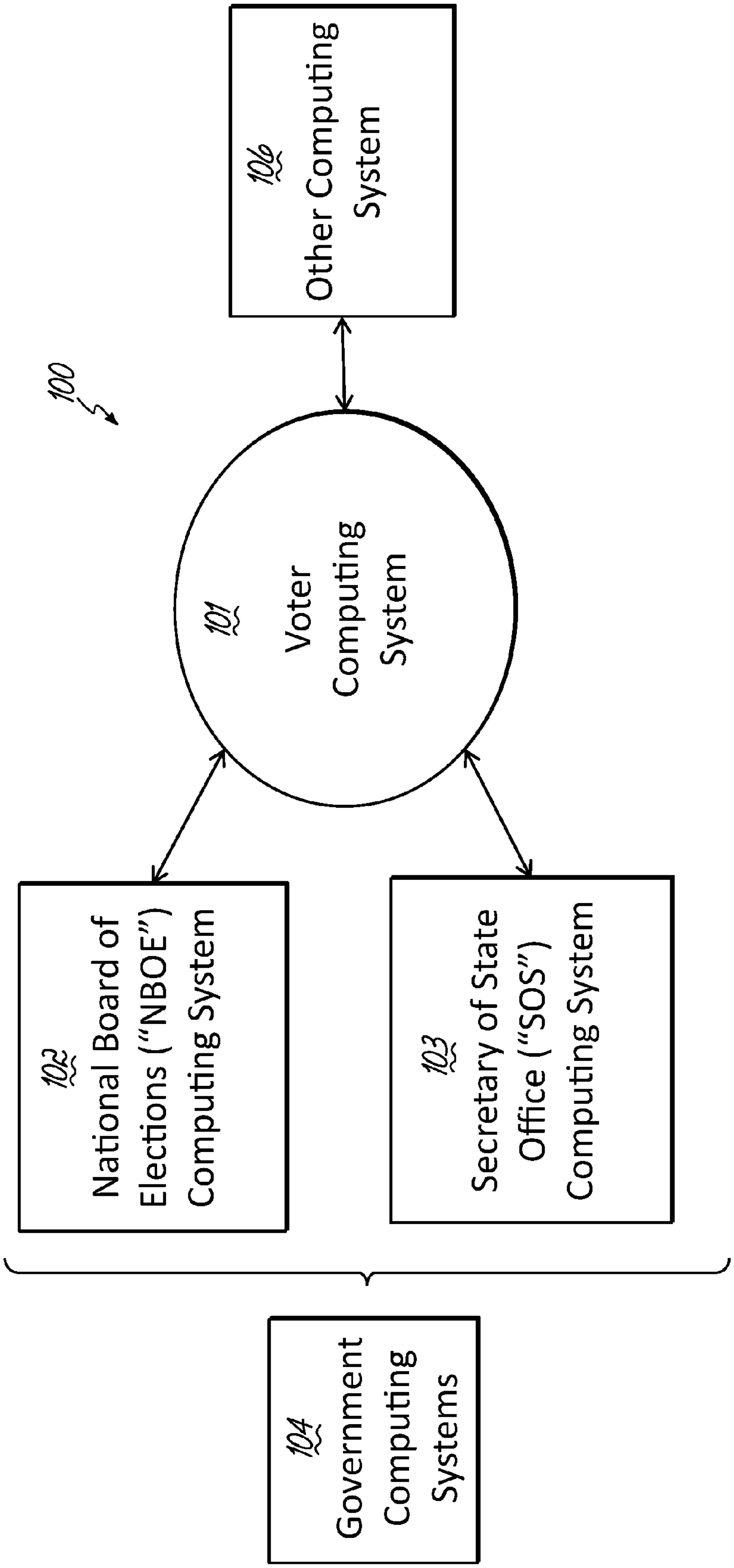
FIG. 1 is a schematic illustration of an exemplary embodiment of an electoral system and the interfacing between a voter computing system of the electoral system and auxiliary computing systems.

Referring now to the figures, and particularly to FIG. 1, where an electoral system 100 having a voter computing system 101 according to a first illustrative embodiment is described. The voter computing system 101 may be operated and/or maintained by a government or civilian based organization, described herein as the American Political and Government Accountability Agency ("APGAA"); however, it would be understood that other entities may operate the electoral system 100 and reference to the APGAA herein should not be considered to be limiting. The computing voter system may interface with a National Board of Elections ("NBOE") computing system 102, which is the national agency charged with operating federal elections; a secretary of state ("SOS") computing system 103 or other similar state-wide agency charged with operating state and local elections and registering voters (NBOE and SOS computing systems referred to collectively as the "government computing systems" and designated with numeral 104; NBOE and SOS collectively referred to as the "election authority"); and other computing systems 106, such as those that are owned by individual eligible voters or as provided in greater detail below.

The voter computing system 101 further includes an interface for accessing and interacting with a database comprising of a plurality of data set to address the challenges noted. Each data correlates to a particular roster of individuals and/or information relative to the electoral system 100. For example, a first data set correlates to a roster of eligible voters; a second data set correlates to a voting record of each of the eligible voters; a third data set correlates to a roster of candidates in an electoral district; a fourth data set correlates to a roster of elected officials and a record of actions taken by each of the elected officials; and a fifth data set correlates to a roster of employees that are employed by a government agency charged with the responsibility for operating and maintaining the voter computing system 101. Each data set of the database and the interface between each is described in greater detail below.

Voter Computing System

Figure 2:
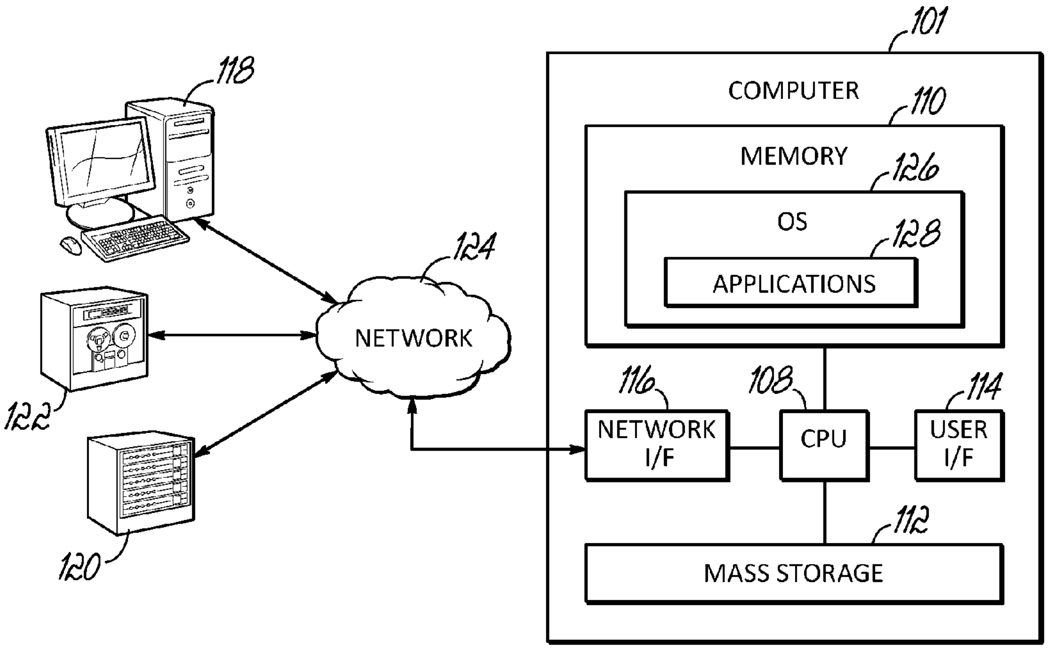
FIG. 2 is a schematic illustration of the voter computing system.

The voter computing system 101 may be structured similar to the exemplary embodiment shown in FIG. 2, which includes an integrated circuit device ("ICD") consistent with embodiments of the invention. The voter computing system 101, for purposes of this invention, may represent any type of computer, computer system, computing system, server, disk array, or programmable device such as multi-user computers, single-user computers, handheld devices, networked devices, etc. The voter computing system 101 may be implemented using one or more networked computers, e.g., in a cluster or other distributed computing system. The voter computing system 101 will be referred to as "computer" for brevity sake, although it should be appreciated that the term "computing system" may also include other suitable programmable electronic devices consistent with embodiments of the invention.

The voter computing system 101 typically includes at least one processing unit 108 (illustrated as "CPU") coupled to a memory 110 along with several different types of peripheral devices, e.g., a mass storage device 112, a user interface 114 (including, for example, user input devices and a display), and a network interface 116. The memory 110 may include dynamic random access memory (DRAM), static random access memory (SRAM), non-volatile random access memory (NVRAM), persistent memory, flash memory, at least one hard disk drive, and/or another digital storage medium. The mass storage device 112 is typically at least one hard disk drive and may be located externally to the voter computing system 101, such as in a separate enclosure or in one or more networked computers 118, one or more networked storage devices 120 (including, for example, a tape drive), and/or one or more other networked devices 122 (including, for example, a server). The voter computing system 101 may communicate with the networked computer 118, networked storage device 120, and/or networked device 122 through a network 124. As illustrated in FIG. 2, the voter computing system 101 includes one processing unit 108, which, in various embodiments, may be a single-thread, multithreaded, multi-core, and/or multi-element processing unit as is well known in the art. In alternative embodiments, the voter computing system 101 may include a plurality of processing units 108 that may include single-thread processing units, multithreaded processing units, multi-core processing units, multi-element processing units, and/or combinations thereof as is well known in the art. Similarly, memory 110 may include one or more levels of data, instruction, and/or combination caches, with caches serving an individual processing unit or multiple processing units as is well known in the art. In some embodiments, the voter computing system 101 may also be configured as a member of a distributed computing environment and communicate with other members of that distributed computing environment through the network 124.

The memory 110 of the voter computing system 101 may include an operating system 126 to control the primary operation of the voter computing system 101 in a manner that is well known in the art. In a specific embodiment, the operating system 126 may be a Unix-like operating system, such as Linux. The memory 110 may also include at least one application 128, or other software program, configured to execute in combination with the operating system 126 and perform a task. It will be appreciated by one having ordinary skill in the art that other operating systems may be used, such as Windows, MacOS, or Unix-based operating systems, for example, Red Hat, Debian, Debian GNU/Linux, etc.

In general, the routines executed to implement the embodiments of the invention, whether implemented as part of an operating system or a specific application, component, algorithm, program, object, module or sequence of instructions, or even a subset thereof, will be referred to herein as "computer program code" or simply "program code." Program code typically comprises one or more instructions that are resident at various times in memory and storage devices in a computer, and that, when read and executed by at least one processor in a computer, causes that computer to perform the steps necessary to execute steps or elements embodying the various aspects of the invention. Moreover, while the invention has been, and hereinafter will be, described in the context of fully functioning computers and computer systems, those skilled in the art will appreciate that the various embodiments of the invention are capable of being distributed as a program product in a variety of forms, and that the invention applies regardless of the particular type of computer readable media used to actually carry out the invention. Examples of computer readable media include, but are not limited to, recordable type media such as volatile and non-volatile memory devices, floppy and other removable disks, hard disk drives, tape drives, optical disks (e.g., CD-ROM's, DVD's, HD-DVD's, Blu-Ray Discs), among others, and transmission-type media such as digital and analog communications links In addition, various program code described hereinafter may be identified based upon the application or software component within which it is implemented in specific embodiments of the invention. However, it should be appreciated that any particular program nomenclature that follows is merely for convenience; and thus, the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, Application Programming Interfaces [APIs], applications, applets, etc.), it should be appreciated that the invention is not limited to the specific organization and allocation of program functionality described herein.

Those skilled in the art will recognize that the environment illustrated in FIG. 2 is not intended to limit the present invention. Indeed, those skilled in the art will recognize that other alternative hardware and/or software environments may be used without departing from the scope of the invention.

Figure 3:
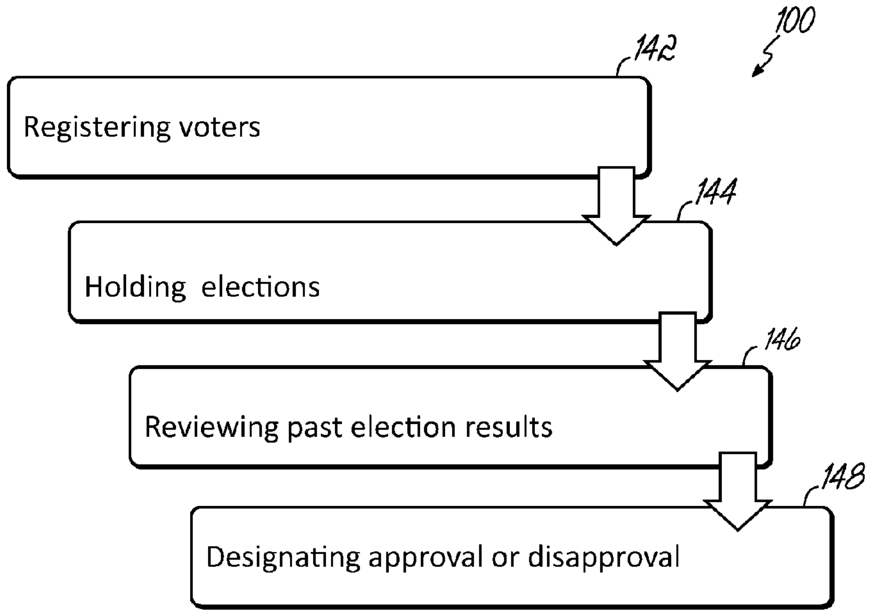
FIG. 3 is a flow chart illustrating various options and processes that may be accomplished with the electoral system.

Various electoral-related processes may be operated by the voter computing system 101. For example, these processes may, as shown in FIG. 3, registering voters 142, holding elections 144, reviewing past election results 146, and designating approval or disapproval of elected officials 148. Each of the electoral processes is described in greater detail below.

Voter Registration

Figure 4:
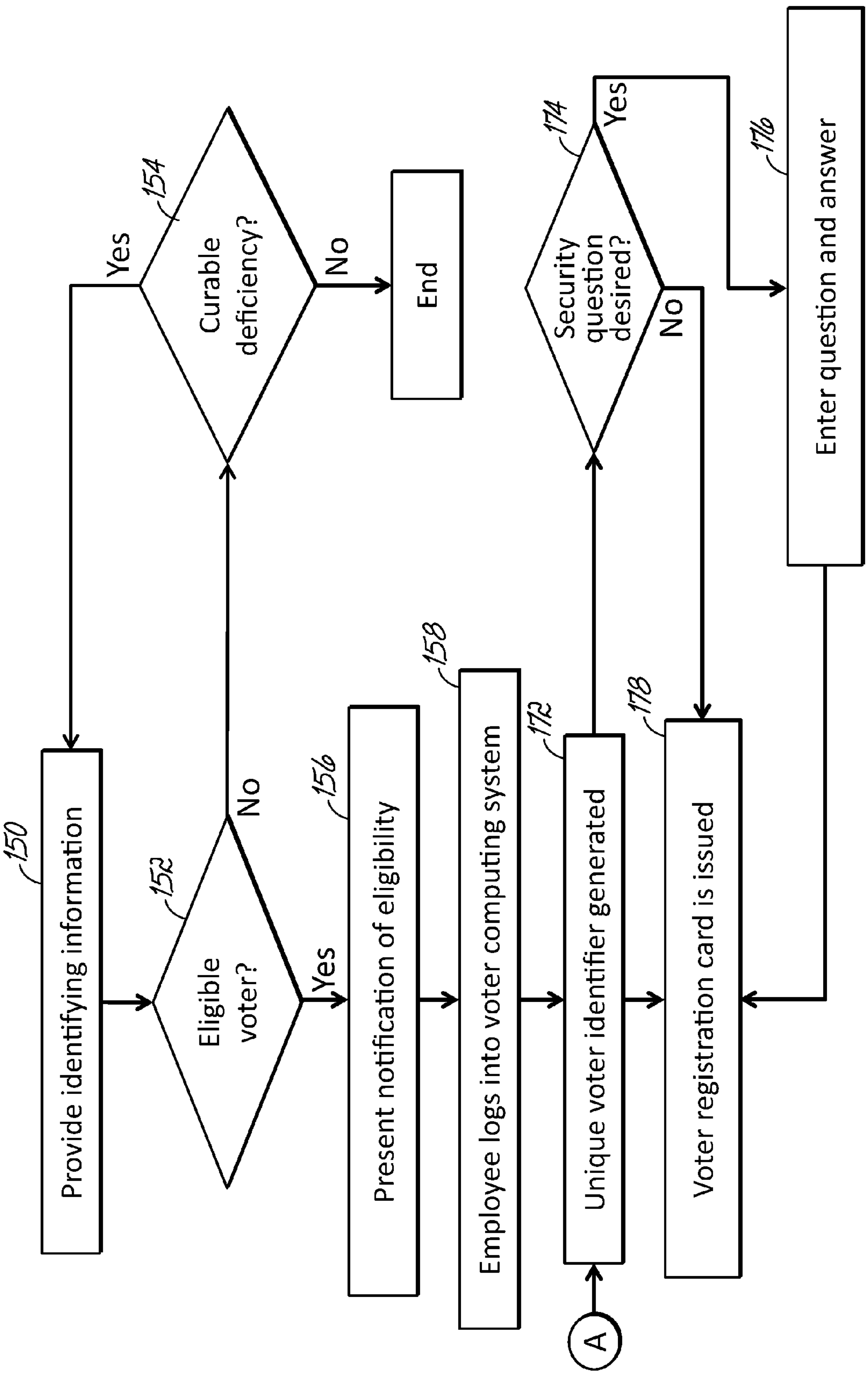
FIG. 4 is a flow chart illustrating one exemplary manner of registering eligible voters with the voter computing system of the electoral system.

The process for registering voters with the voter computing system 101 is illustrated in FIG. 4. Typically, voter eligibility is based on state dependent criteria and, generally, an individual may be eligible to vote if he is a legal U.S. citizen of a particular voting age, has established residency within an electoral district, and is neither incarcerated nor incompetent. It should be readily understood that use of the masculine pronouns "he," "his," and variants of the same are meant to be gender neutral and incorporate both feminine and masculine referents. The election authority determines eligibility with the individual providing identifying information in Step 150. The election authority, using the identifying information, decides in Inquiry 152 as to whether the individual meets the criteria for voter eligibility. If eligibility is confirmed, notification may be forwarded by letter, email, facsimile, telephone call with password or clearance code, or other secure means to the eligible voter. However, if eligibility cannot be confirmed, then the election authority determines whether there is a curable deficiency in the individual's record in Inquiry 154. If yes, then the individual may be provided an opportunity to cure the deficiency; otherwise, the process ends.

With eligibility notification in hand, the eligible voter may then present the eligibility notification to the APGAA for access to the electoral system 100 (FIG. 1) and entry into the voter computing system in Step 156. The voter may present the eligibility notification by providing the letter, email, facsimile, password, clearance code, or other eligibility notification, along with a proper identification (for example, a state issued driver's license or a passport) to an employee of the APGAA. The employee, who is listed on a roster of employees within the voter computing system 101 (FIG. 2), may possess identification, such as an employee card, for performing duties related to their employment. The identification may include a photograph of the employee, a bar code, biometric information, or other known security measures to ensure that only listed employees on the roster may perform duties relative to the voter computing system 101 (FIG. 2).

Figure 5:
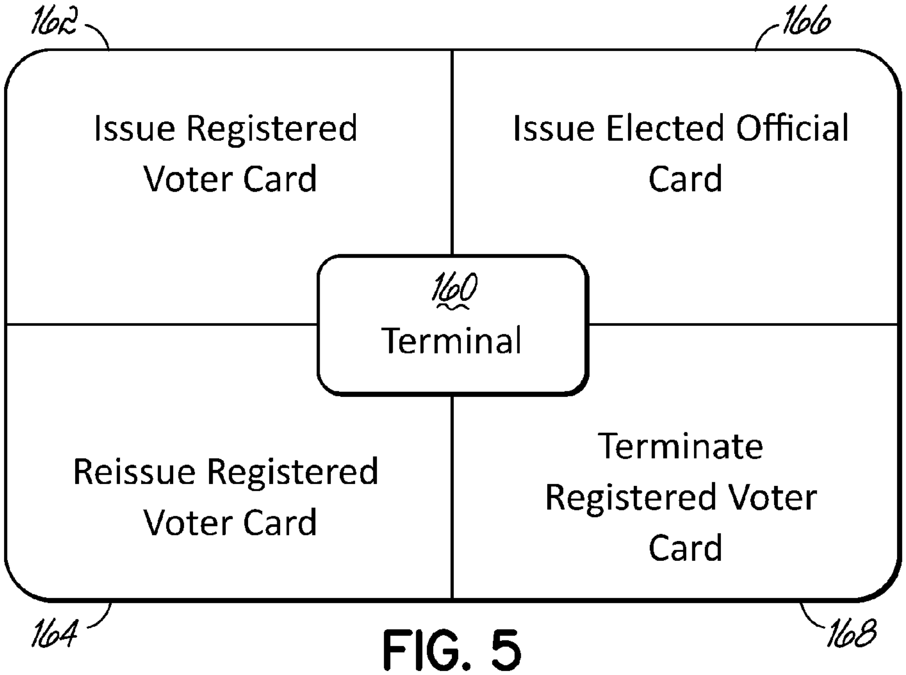
FIG. 5 is a schematic illustration of various functionalities of a terminal associated with the voter computing system.

In Step 158, the employee may interface with the voter computing system 101, for example, by way of a computer or terminal 160 (FIG. 5), which presents a series of duties operable by the employee, including, for example, those shown in FIG. 5. The terminal 160 may include any of the variety of user interfaces 114 described previously, including a touch screen or keyboard entry. The series of duties may include issuing a voter registration card 162, reissuing a voter registration card 164, issuing an elected official card 166, and/or terminating a voter registration card 168. In one embodiment, when the employee selects a duty to perform, the terminal 160 may request that the employee certify his employment status, which may be accomplished by scanning the barcode of his employment card, providing a password, and/or providing the biometric information or data. In this way, the voter computing system 101 indentifies the employee taking the action, records the action taken, and saves the record of action taken to be later retrieved for investigations if necessary.

To issue a registration card to an eligible voter, the employee makes the appropriate selection on the terminal 160 and proceeds with registering the eligible voter with the voter computing system 101 (FIG. 1) via the terminal 160. At the time of registration, the voter computing system 101 (FIG. 1) may collect certain information, including the Internet protocol ("IP") address of the terminal 160, a terminal identification if any, electoral district in which the eligible voter resides, employee information for the employee undertaking the duty, and a timestamp corresponding to the date and/or time of the data entry. While generally the voter computing system 101 may be beneficially operated without including specific personally identifying information of the eligible voter (i.e., name, residential address, etc.), one of ordinary skill would understand that the voter computing system 101 (FIG. 1) is not so limited. Typically, personally identifying information may only be retained by the government computing systems 104 (FIG. 1).

Returning again to FIG. 4, when the necessary information has been entered, the voter computing system 101 (FIG. 1) stores the information in a first data set and then generates a unique voter identifier, which may include a user name and/or a PIN, generated in Step 158. One or both of the user name and/or PIN may be alpha-numeric, for example a six-character output of letters, integers, and/or special characters, selected or randomly assigned, such that each eligible voter has a unique voter identifier. Further, the voter computing system 101 (FIG. 1) may provide the option of providing a voter generated access code and/or include an Inquiry 174 as to whether the eligible voter desires a security question should retrieval of the unique voter identifier and/or access code be necessary. If this additional security is desired, then the eligible voter may select a question and answer in Step 176. In some embodiments, the section of a PIN may be required by the voter computing system 101 (FIG. 1). The result, in Step 178, is the issuance of the voter registration card.

Figure 6:
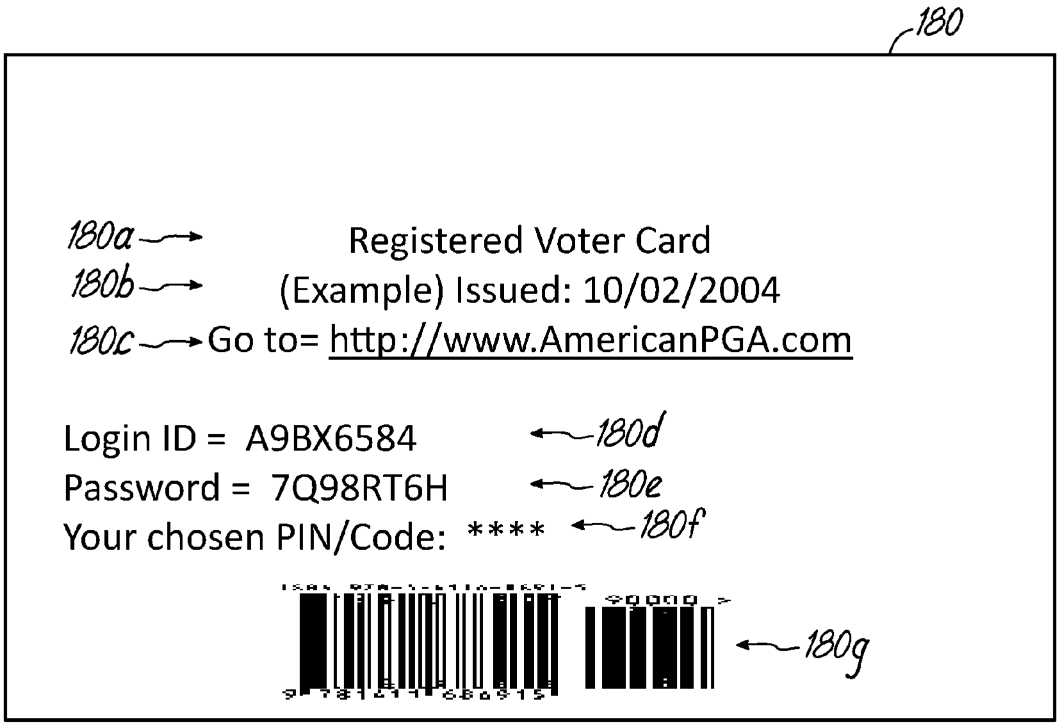
FIG. 6 is an exemplary embodiment of a voter registration card issued by the terminal of FIG. 5.

Issuing the voter registration card may be accompanied with printing of the voter registration card, for example, the card 180 shown in FIG. 6. The voter registration card 180 may include: (1) a card title 180*a* (title would differ for employee card or elected official card); (2) an issue date 180*b*; (3) an appropriate website address 180*c* for interfacing with the voter computing system 101 (FIG. 1) in a manner described in greater detail below; (4) the unique voter identifier, which includes a randomly generated log-in ID 180*d* and password 180*e*; (5) a notation 180*f* as a reminder that the voter provided the PIN at the time of voter registration; (6) and a barcode 180*g* or other encoding means.

In some embodiments, the voter computing system 101 (FIG. 1) may print a second voter registration card, similar to the first, that is maintained by the election authority. In other embodiments, the unique voter identifier may be sent to the election authority, such as via a secure internet connection, email, facsimile, or other known means. In this way, the personal identification (name and etc.) of the eligible voter may be correlated to the unique voter identifier generated by the voter computing system 101 (FIG. 1). Otherwise, no personal identifying information is stored in the database of the voter computing system 101 (FIG. 1).

At some future time, it may be necessary to reprint the voter registration card 180 (FIG. 6), such as when the card 180 is destroyed, misplaced, lost, stolen, or other. In that regard, the individual may return to the APGAA office to request a new voter registration card in accordance with a manner 164 shown in FIGS. 5 and 7.

Figure 7:
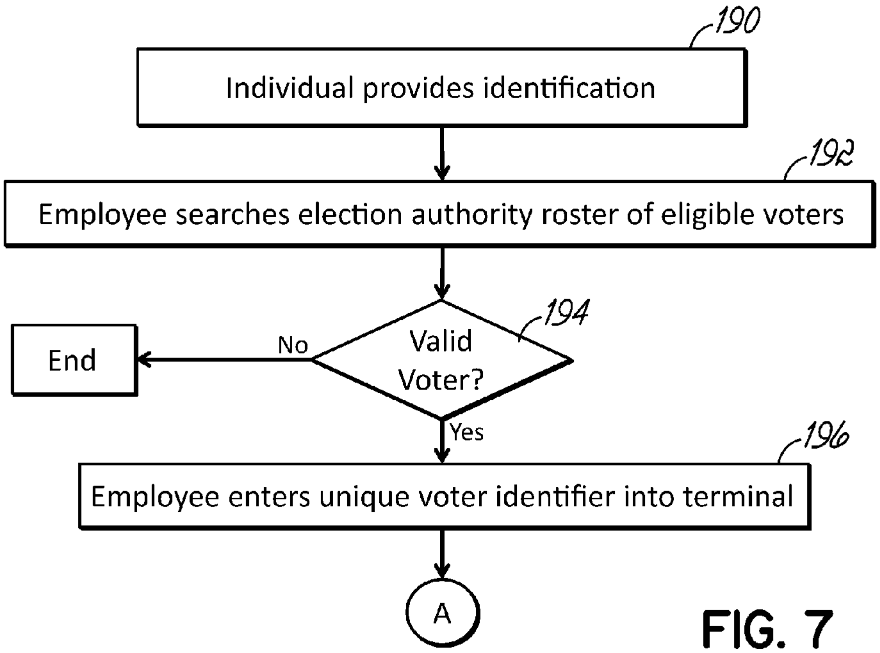
FIG. 7 is a flow chart illustrating one exemplary manner of reissuing a voter registration card with the voter computing system of the electoral system.

In Step 190 of FIG. 7, the individual may present identification to the employee to verify his identity. Because the voter computing system 101 (FIG. 1) generally does not retain personal identifying information of the eligible voters, the employee may need to search the government computing systems 104 (FIG. 1) or other relevant agency's roster of eligible voters in Step 192. Under Inquiry 194, the employee determines whether or not the individual is a registered voter by locating the individual's information in the roster; otherwise, the employee would indicate to the individual that he is not listed as an eligible voter, which may be due to employee error, false identity, the individual has not previously registered to vote, or another issue. In that regard, the employee does not continue with the process to reissue the voter registration card and the individual may return to Step 150 of FIG. 4 if desired or necessary.

If the employee does verify the voter eligibility, the employee retrieves the unique voter identifier associated with the registered voter and logs into the voter computing system 101 (FIG. 1) via the terminal 160, selects the reissue voter registration card option 164, and enters that unique voter identifier as prompted in Step 196. The process of reissuing the voter registration card may then proceed in a manner that is consistent with issuing the voter registration card and as shown in FIG. 4. To reduce the possibility of fraud, the eligible voter may be asked to enter the voter generated access code and/or the security question if those options were previously designated.

The issuing and reissuing of an employee card, an elected official card, or other similar card for permitting interaction with the voter computing system 101 (FIG. 1) may be achieved in a manner that is consistent issuing the voter registration card. When issuing the elected official card, the elected official may be required to present personal identification as well as be identified as the winning candidate from an election; employees may be issued employment cards from other employees or supervisors; and so forth. In all instances, the voter computing system 101 (FIG. 1) may record a terminal IP address, a terminal identification if any, an electoral district, employee information for the employee undertaking the duty, and a timestamp corresponding to the date and/or time of the data entry.

Figure 8:
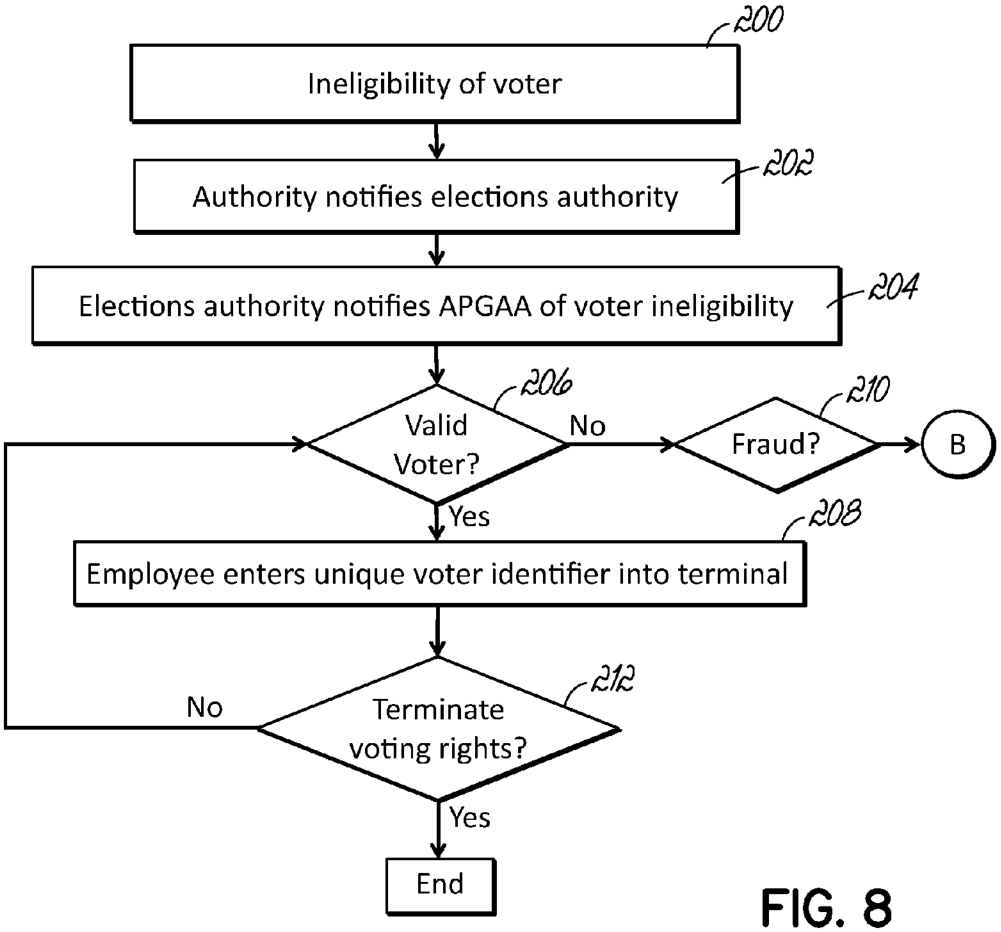
FIG. 8 is a flow chart illustrating one exemplary manner of terminating voter eligibility with the voter computing system of the electoral system.

To further reduce the occurrence of fraud, individuals may be removed from the roster of eligible voters as necessary, such as in death, incarceration, or other noncompliance with registration laws. One such process for removing individuals is shown with reference to FIGS. 5 and 8. In Step 200, the voter becomes ineligible, such as by one of the known means. Then in Step 202, the necessary authority (i.e., police or sheriffs office, coroner's office, mental health institute, or other) notifies the election authority of the voter's ineligibility. In Step 204, the election authority notifies the APGAA of the voter ineligibility. If the individual is a valid voter, as determined at Inquiry 206, then the employee with the APGAA retrieves the unique voter identifier of the individual in Step 208. If the individual is not listed as a valid voter, then a fraud investigation may ensue at Step 210.

The employee may then log into the voter computing system 101 (FIG. 1) via the terminal 160, select the terminate voter registration card option 168, and enter that unique voter identifier. The voter computing system 101 (FIG. 1) may then terminate all rights associated with the entered voter unique identifier, which may further include recording of employee information and other details of the transaction as provided above.

As provided with some detail, the electoral system 100 (FIG. 1) with voter computing system 101 (FIG. 1) provides a process for maintaining a valid roster of eligible voters and a history of transactions made by employees regarding the roster of eligible voters. This process reduces the likelihood of fraudulent activity and provides a method of voting, as described below.

Elections and Voting

Figure 9A:
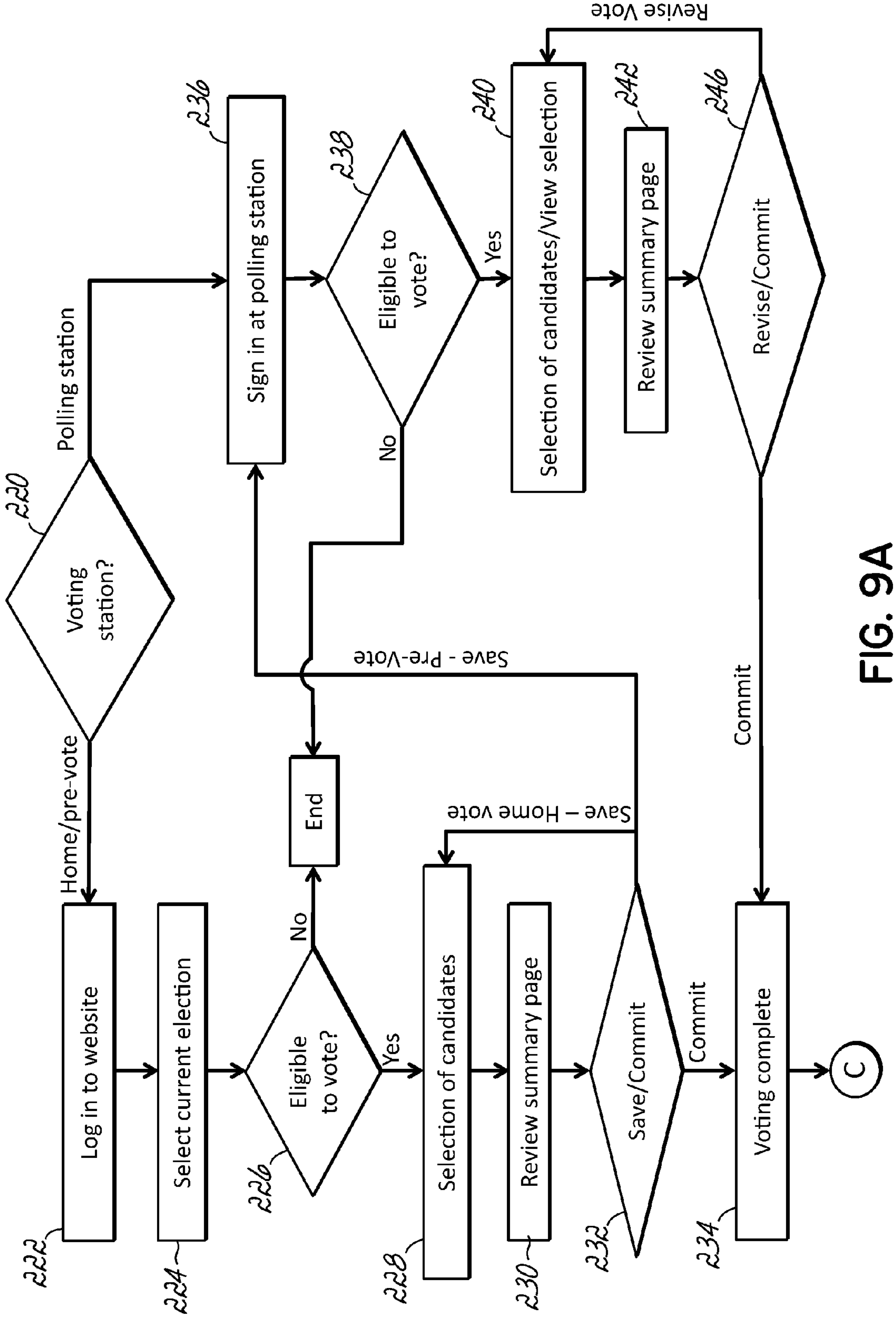
FIG. 9A is a flow chart illustrating three exemplary manners of voting accomplished with the voter computing system of the electoral system.

The voter computing system 101 (FIG. 1) permits the eligible voter to choose a voting station from a home polling station, a split polling station, or a polling voting location. In that regard, and with reference to FIGS. 1, 9A, and 9B, a method of voting using the voter computing system 101 is described. On Election Day, the eligible voter participates in the election by selecting the desired voting station at Inquiry 220. That is, because the voter computing system 101 may be operated to record information that is indicative of a vote cast by each eligible voter, then the voter computing system 101 may be operated to enable remote voting (e.g., at home) and/or review of a voting history.

Figure 10:
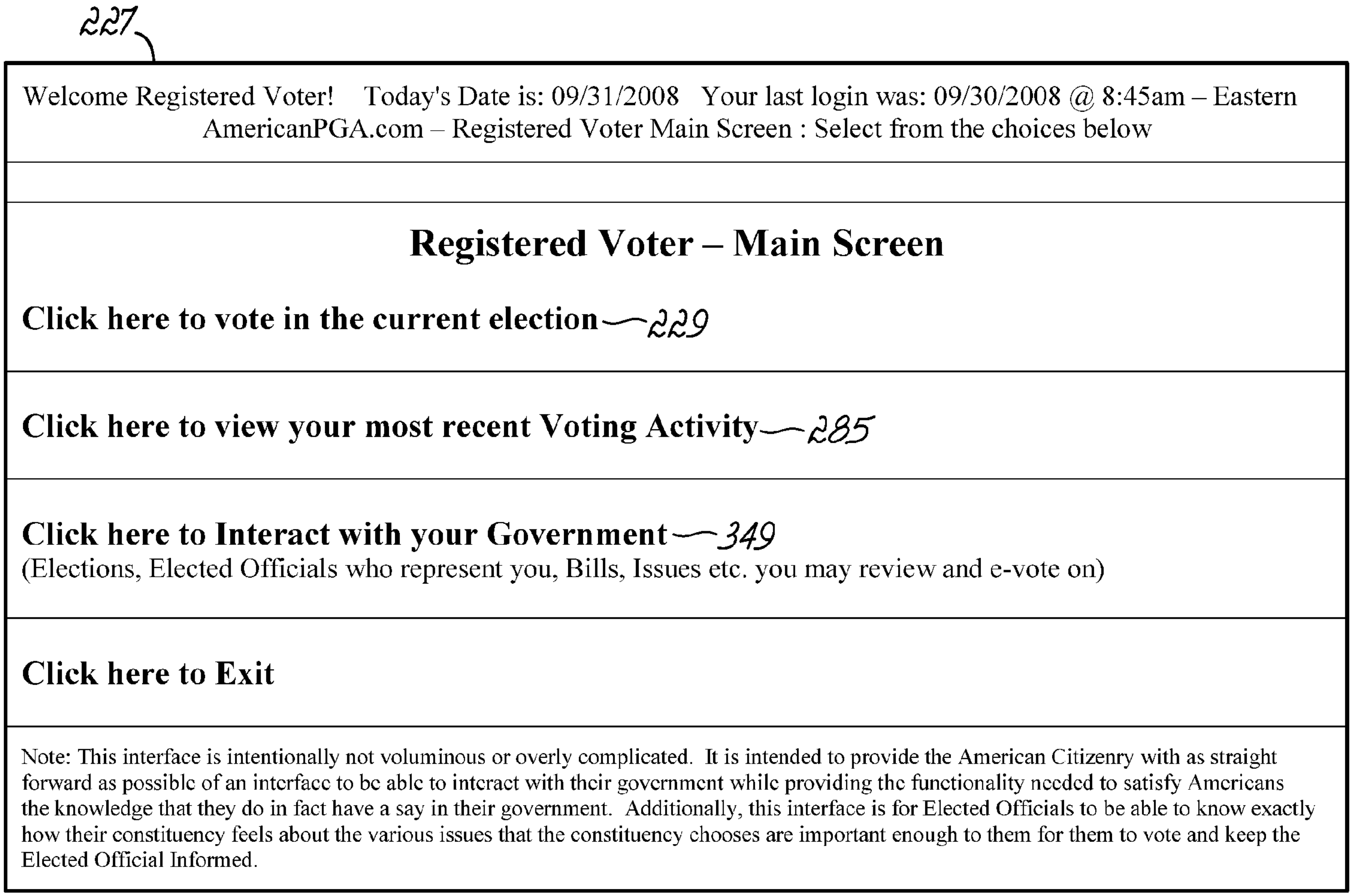
FIG. 10 is a voter log-in screen capture from a website for accessing the voter computing system of the electoral system.

To vote remotely, the voter accesses the voter computing system 101 by a secure connection via the other computing system 106, such as the terminal, a personal home computer with an Internet browser, a smart phone, or other known means, by accessing the website listed on the voter registration card by entering the unique voter identifier in Step 222. The website associated with the voter computing system 101 is then loaded, and may be similar to the log-in screen 227, shown in FIG. 10. The voter then selects the option associated with voting in the current election 229. In that regard, the voter computing system 101 determines, at Inquiry 226, whether the voter is eligible to vote in the current election, i.e., whether the voter has previously committed a vote in the current election or has lost voter eligibility, as provided in detail above. If the voter is not eligible to vote in the current election, the process ends; otherwise the website presents a ballot containing a roster of candidates for selection and/or a listing of one or more issues presented for vote in Step 228. The one or more issues that may be presented for vote may include, for example, state constitutional amendments, local or municipality ordinances, school operating levies, referendums, voter initiatives, and so forth.

The ballot may be formatted according to any number of electronic ballot systems, such as those taught in U.S. Pat. No. 7,549,049, issued to Bogasky et al. on Jun. 16, 2009, entitled DYNAMIC AUDITING OF ELECTRONIC ELECTIONS; U.S. Pat. No. 7,497,377, issued to Watson on Mar. 3, 2009, entitled ELECTRONIC POLL REGISTER SYSTEM FOR ELECTIONS; and U.S. Pat. No. 5,218,528, issued to Wise et al. on Jun. 8, 1993, entitled AUTOMATED VOTING SYSTEM; and Patent Publication Nos. 2009/0079538, published on Mar. 26, 2009, by Fein et al. and entitled MULTICOMPUTER DATA TRANSFERRIGN AND FILE ACCESSING TO AUTHENTICATE ONLINE VOTING AND REGISTRATION IN A SECURE DATABASE SYSTEM; 2006/0289638, published on Dec. 28, 2006, by Schilling and entitled VOTING VERIFICATION SYSTEM AND METHOD; and 2002/0138341, published on Sep. 26, 2002, by Rodriguez et al. and entitled METHOD AND SYSTEM FOR ELECTRONIC VOTER REGISTRATION AND ELECTRONIC VOTING OVER A NETWORK.

After the voter finishes selecting candidates and/or deciding on the issues, the voter is presented with a summary page to review in Step 230. After reviewing the summary page, the voter may then choose, at Inquiry 232, to save the candidate selections and issues decisions or to commit the selections as his vote. If the latter is selected, then voting is completed in Step 234. If the voter selects the save option, the voter may, at a later time, return to the website in Step 228 to alter the selection of candidates and/or change a decision on one or more issues or to Step 230 to review the previous selections and decisions and then so choose to commit the vote.

Alternatively, the voter may choose to save the selection as a pre-vote. In this regard, the voter would then travel to the polling station on Election Day for committing his vote in a manner that is similar to standard polling station voting, described in detail below.

If the voter selects to vote exclusively at the polling station, the voter must first verify his identity after arriving at the polling station at Step 236. This identity verification may include the presentation of the voter registration card 180 (FIG. 6), a drivers' license, or other identification for cross-reference with the roster of eligible voters that is maintained by the election authority to determine voter eligibility for the current election, as in Inquiry 238. The employee provides the voter with a paper ballot or an access card for use with a conventional ballot machine. Alternatively, the voter uses his voter registration card and/or his unique voter identifier to access the ballot from the ballot machine or interface with the voter computing system 101 (FIG. 1) via a terminal or a computer.

If the voter has previously saved a selection of candidates and/or decisions on the issues, then the voter may simply view his pre-vote selections in Step 240. Otherwise, the voter may select the candidates and/or decide the issues anew. A summary page may then be generated for the voter to review in Step 242. If a change is desired, then the voter may select "revise" from Inquiry 246 and return to Step 240 to make a different selection of candidates or change his decision on one or more issues. If no change is desired, then the voter may commit his vote.

Figure 9B:
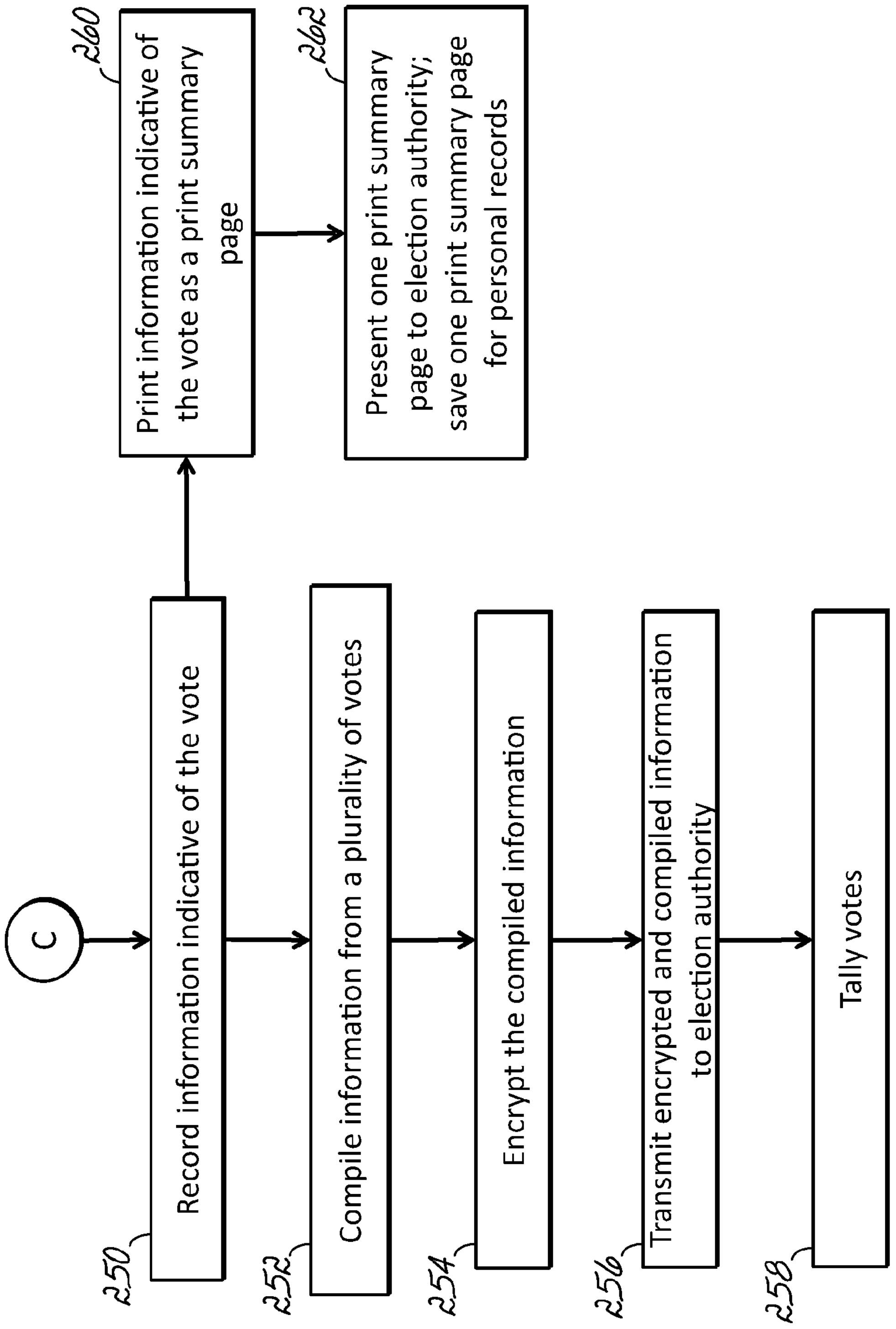
FIG. 9B is a flow chart illustrating one exemplary manner of transmitting a vote from the voter computing system of the electoral system to the election authority for tally.

Turning now to FIG. 9B, where the process of transferring the committed votes for tally is described in detail. After the voter commits his vote, certain information indicative of the vote is recorded to the database of the voter computing system 101 in Step 250. The information indicative of the vote includes, for example, the unique voter identifier, the candidates selected for each office being elected, the decision on each issue, the IP Address of the computing system used to make the access, the date and timestamp of the save/commit, and/or the electoral district represented by the voter. Other or additional information may also be collected and the manner of doing so would be known to those of ordinary skill in the art.

With certain information recorded, the voter computing system 101 forwards the information indicative of the vote (i.e., candidate selections and decisions on each issue) to the election authority for tally. In one embodiment, the voter computing system 101 compiles the information indicative of the votes from a plurality of separate ones of the eligible voters in Step 252, such that the votes may be transferred as a batch (i.e. zip compressed or other appropriate format) in order to prevent the immediate correlation of vote-to-voter in a one-to-one relation. The compiled votes are encrypted in Step 254 (i.e. MD5, SHA, CRC, etc.) and then transferred, in Step 256, to the election authority. Tally of the votes, in Step 258, occurs in the conventional manner or other appropriate means.

Alternatively, or concurrently, to the electronic process described for tallying the vote, the information indicative of the vote may be printed in Step 260. Generally, printing may be accomplished at the polling station and from the terminal when committing the vote. In one embodiment, two paper copies of the print summary page are printed, one to be deposited with the election authority and the other to be retained by the voter as a record copy, as provided in Step 262. Each copy of the print summary page includes the information indicative of the vote in text format, encrypted format, or a combination thereof. In other embodiments, the print summary page is printed in Portable Document Format (*.pdf), as a text document in *.txt, *.rtx, *.doc, or other similar formats, and/or may be presented as a downloadable file to the voter for printing and/or saving to the voter's computer memory or mass storage device. In yet other embodiments, the information indicative of the vote is correlated to a unique document identifier, which may be a randomly generated serial number, a bar code, or other encryption type of device. Given the unique document identifier, the voter computing system 101 (FIG. 1) may generate the information indicative of the vote from the database, which permits a paper trail to be generated while maintaining secrecy of the vote.

If desired, the voter may validate the two print summary pages with the APGAA or similar authority prior to submission to the election authority. In this way, the information indicative of the vote from the print summary page is entered into and confirmed by the voter computing system 101. One manner of entering and confirming the information includes scanning the barcode of the print summary page and then comparing the recorded vote with the textual format; another manner includes scanning the print summary page, or the unique document identifier, and using character recognition software to confirm the information. Once the information has been validated, then the voter deposits the first copy as described above.

As described, the electoral system 100 and voter computing system 101 may be operable to allow the eligible voter to preliminarily cast a vote and/or commit their vote by remotely accessing the voter computing system and/or from the polling station on Election Day.

Reviewing Vote History

After Election Day, a voter may desire to review a record of his voting history. Conventionally, reviewing the voting history was not possible as there has been no manner of tracking a vote to a voter without the use of personal and identifying information and without losing the secret ballot nature of the election. With the voter computing system 101 described above, it is possible for the voter, and indeed an independent audit agency, to review the vote history and/or affirm the validity of an election.

One exemplary manner of reviewing vote history is described with reference to FIGS. 1, and 11A-11C. The process begins with Inquiry 280 with a decision to review a vote. This review may be accomplished by the voter's own initiative, by request of the APGAA or the election authority to the voter to review their vote, or by audit initiated by the election authority or other government authority.

When the review is to be completed by the voter, the voter logs into the website in Step 282, in a manner that was generally described above. The voter is presented with the log-in screen 227 (FIG. 10) and in Step 284, selects the option to view the most recent voting activity 285. While only the option of viewing the most recent voting activity is shown, it would be understood that the website could also allow the voter to select a voting activity from any earlier election in which he voted. The voter computing system 101 generates the print summary page, or another version thereof, containing the information indicative of the vote for the election. One example of the print summary page 285 is shown as a screen capture in FIG. 12. The voter reviews the information indicative of the vote cast in the particular election and determines whether an error is present at Inquiry 286. If the print page summary accurately reflects the vote cast as recalled by the voter, then no discrepancy is present and the vote is validated at Step 288. However, if the information indicative of the vote is not consistent with the voter's memory of the vote cast, then a discrepancy is reported in Step 290. In Step 292, in order to reconcile the discrepancy, the voter consults a paper trail record that they may have resulting from the record copy print out of the print page summary and/or other personal notes of the votes cast. If the information indicative of the vote does not match the paper trail record at Inquiry 294, then a discrepancy report is generated and transmitted to the election authority in Step 296; otherwise, the record is validated in Step 288. If the voter is unable to produce or consult the paper trail record (for example, if the paper trail record has been destroyed, lost, or stolen), then the issue of vote discrepancy cannot be resolved and no discrepancy report is generated.

With the discrepancy reported, the voter provides his personal records to the election authority in Step 302, including the record copy of the print summary page, for an investigation. The election authority will then scan, enter, decrypt, download, or otherwise retrieve the information indicative of the vote from the personal records supplied in Step 304. The voter computing system 101 retrieves the information indicative of the vote corresponding to the unique voter identifier and the particular election under consideration from the second data set of the database in Step 306. An Inquiry 308 is made to compare the votes, and if the votes do not match, then a criminal investigation may be initiated in Step 312; if the votes match, then the vote is validated in step 314.

Figure 11A:
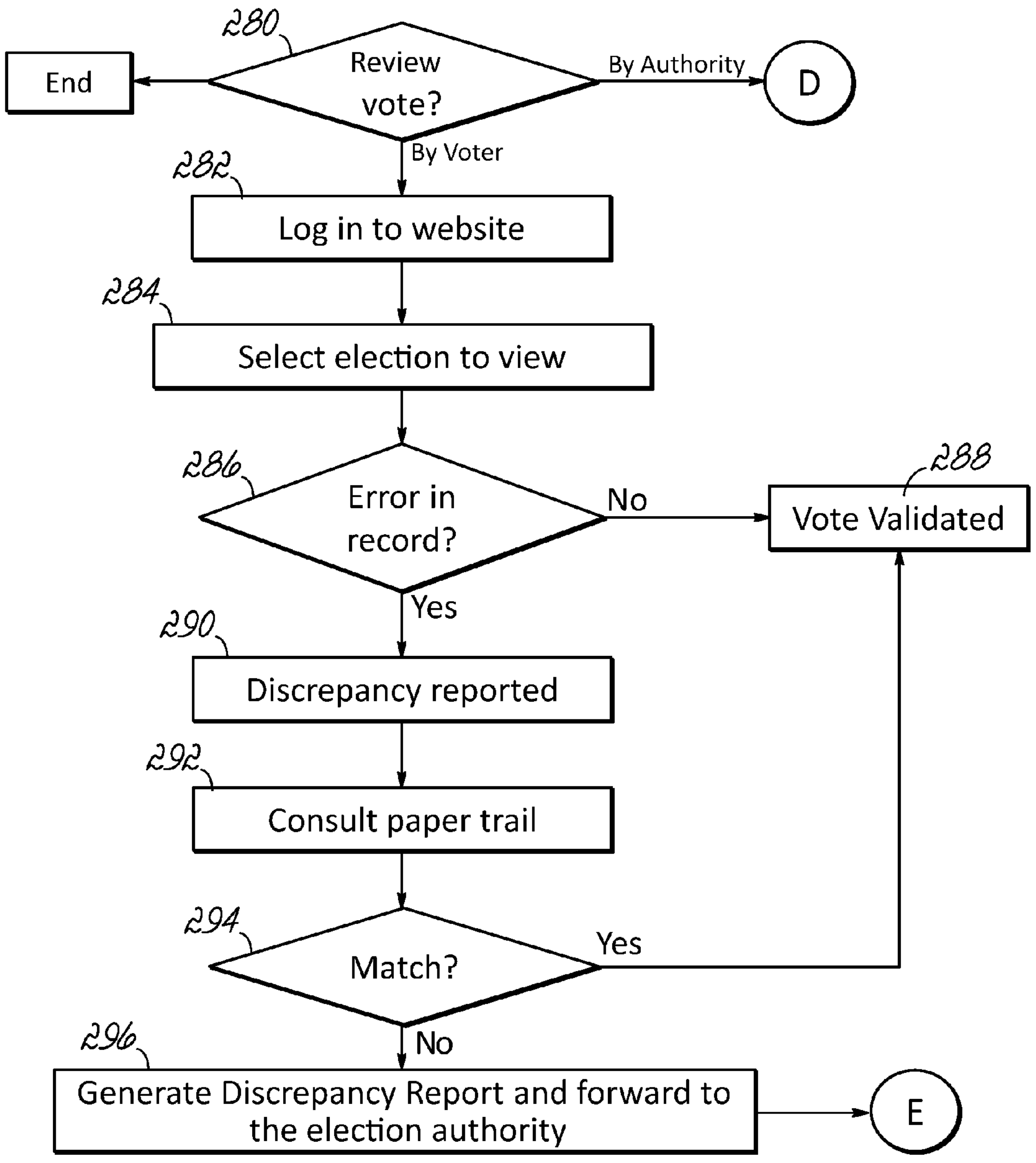
FIGS. 11A-11C are flow charts illustrating various methods of reviewing information indicative of a vote from a previous election from the voter computing system of the electoral system and reporting a discrepancy.
Figure 11B:
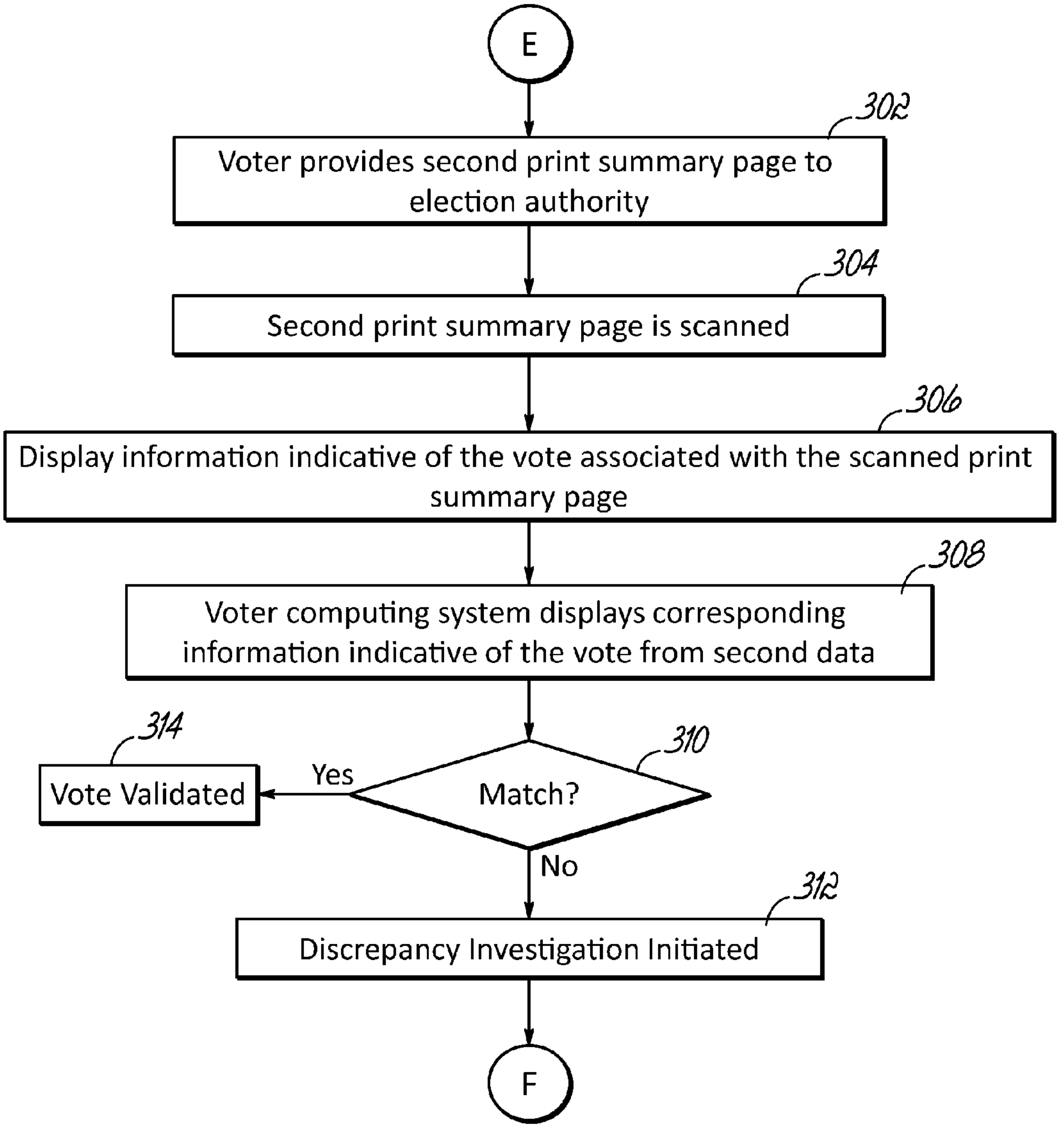
Figure 11C:
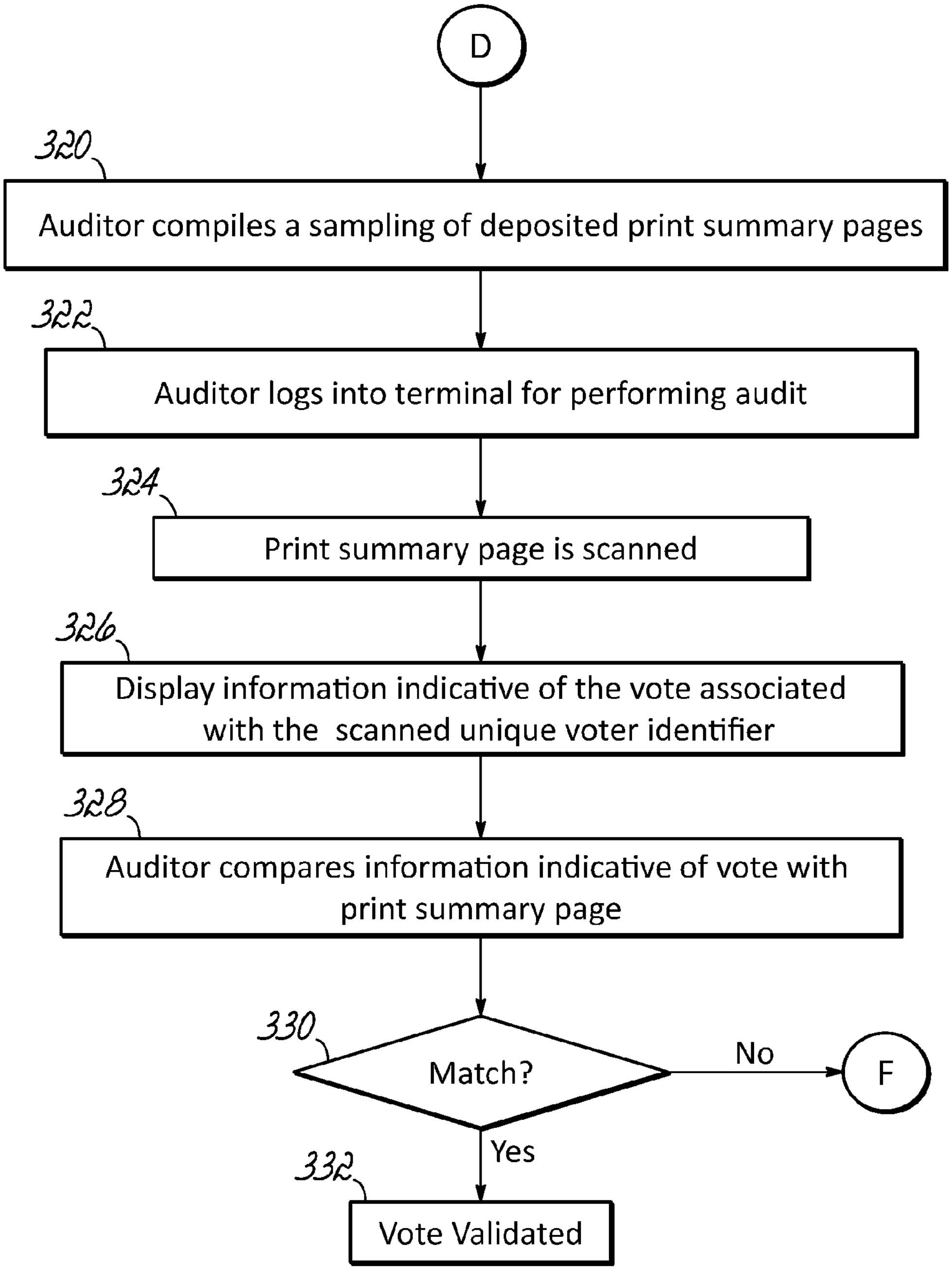

Returning again to the initial Inquiry 280 of FIG. 11A where the election authority or other government authority decides to validate an election. Accordingly, the election authority will designate an auditor responsible for conducting the review. The auditor may include persons from accounting firms or election authority trained staff; in some embodiments two separate persons conduct the review of the same election to provide comparable results. The auditor compiles a sampling of print summary pages that were deposited with the election authority on Election Day in Step 320. The sampling may include a physical pile of paper copies that were deposited and/or a collection of digital print summary pages that had been electronically transferred to the election authority. Then, the auditor interfaces with the voter computing system 101, for instance at the terminal 160, by logging into the voter computing system 101 and designating an option to perform an audit in Step 322. While not specifically shown, the options available to the auditor at the terminal 160 may be limited to those having been assigned an Auditor's Card, which may be similar to the employee's card but for the limited purposes of performing the audit.

Once the audit has been initiated at a terminal 160, the auditor proceeds with entering the information indicative of the vote from each of the print summary pages in Step 324. Entering the information from paper copies may include scanning the bar code, use of character recognition software, manual entry, or other known means; digital copies of the print summary pages may be downloaded from an external storage drive or secure connection via the Internet, for example. The voter computing system 101 utilizes the unique document identifier, or identifies the associated unique voter identifier associated with the print summary page, and recalls the information indicative of the vote from the designated election from the second data. The information indicative of the vote from the second data is then displayed at the terminal 160 in Step 326. In Step 328, the auditor compares the paper recorded version of the vote from the print summary pages with the information indicative of the vote on the terminal from the second data. A decision is made at Inquiry 330 as to whether the votes match. If the votes match, then the vote is validated in Step 332; if the votes do not match, then a discrepancy and/or criminal investigation may be initiated.

By presenting a method by which the eligible voter and/or the election authority may conduct a review and/or audit of prior election results, the eligible voter can feel secure that his vote was counted, as intended, in determining the election results.

Elected Official Accountability

The electoral system 100 further allows the eligible voter to securely review the actions taken by those elected to office, i.e., elected officials. With reference now to FIGS. 1 and 13-16, one such exemplary manner of elected official accountability is described with greater detail.

Figure 13:
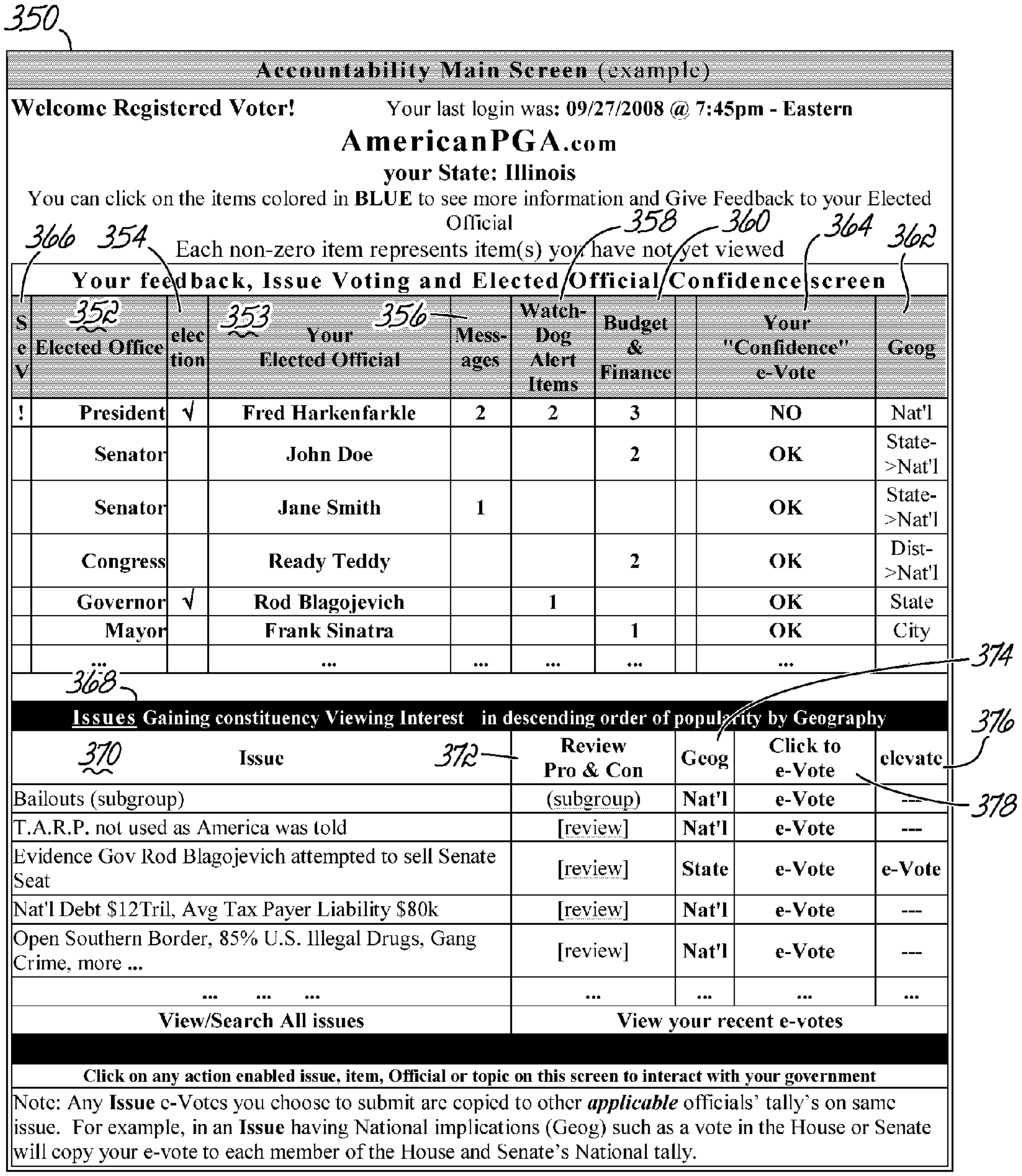
FIG. 13 is an accountability page screen capture from the website for accessing the voter computing system of the electoral system.

To review the actions, the voter may interact with the website and from the log-in screen 227 (FIG. 10), selects the option to interact with your Government 349, which loads an accountability page. FIG. 13 is an exemplary screen capture of the accountability page 350. For instance, various elected offices 352 are shown, including positions in the federal government (President, Senators, and House of Representatives), state government (governor, state delegates, etc.), local government and/or municipalities (mayor, trustees, etc.), along with the name of the persons 353 elected to that office. Additional columns include:

Election 354—indicator that the eligible voter is of the opinion that the particular office should be up for election. Said another way, if the particular office does not have an assigned term limit, then this indicator would designate that the eligible voter believes that the incumbent, and/or other candidates, should campaign for election to that office;

Messages 356—indicator that the elected official has sent a message to his constituency and the eligible voter has a number of these unreviewed messages;

Watch Dog Alert Items 358—messages or alerts posted by "watch dog organizations," which are groups, typically non-profits, that monitor government, consumer, and industrial activities for the purpose of promoting political activism. Typically, more than one watch dog organizations are designated to send alert items and/or to reviews of Pro/Con message submissions and Election Official Comments to the eligible voters of the constituency. In this way, each eligible voter is given a neutral analysis on each issue by reviewing various perspectives (from different watch dog organizations) on each issue. In some embodiments, the eligible voter may uniquely designate which watch dog organizations may send alert items to his alert items 358; in other embodiments, the eligible voters comprising the whole of the constituency may so designate;

Budget & Finance 360—the APGAA may designate an authority with the responsibility for uploading, linking to, or otherwise notifying the relevant contingency of any pending legislation related to the power of the purse, i.e., budget and/or finance concerns. The pending legislation may be presented in the narrative form or in a summary form. The summary form may include a spreadsheet containing several columns, i.e., a column containing a very brief description of what the item is that's being paid for, a total cost column, and a column showing the median cost per taxpayer (relative to the taxpaying public in the geographic scope of the bill's influence);

Geog 362—indicates the geography or district covered (i.e., city, state, or federal) by the representation of each elected office;

Your "Confidence" Vote 364—when the voting citizen believes that the elected official is acting in direct conflict with the public good and/or the public's "balanced sensibilities," then the voting citizen may change his confidence vote from the default "Yes" (i.e., approval of action) on all issues and budget matters to "No" (i.e., disapproval of action) on those matters that the voting citizen believes the elected official is acting outside the interest of the public. Though not specifically shown in the illustrated embodiment, it may be possible for the percentages of Yes and No confidence votes for each elected official to be presented for viewing. In the event that a statistically significant majority percentage of the eligible voters changes their confidence vote to "No," then an indicator may appear in the SeV column The statistically significant majority may be determined by any appropriate statistical model or presented as a static percentage, such as 70%; and SeV 366—means a special e-Vote; when an indicator is present in this column for a particular elected official, then a number of eligible voters have indicated a "No" confidence vote of this elected official and the eligible voter may indicate what action, if any, should be taken against the elected official (e.g., censure, suspension of voting privileges, elected official recall, or other as determined by the number of eligible voters).

Another portion of the accountability page 350 provides a listing of issues 368 that are gaining constituency interest. The listing may be ordered according to recent interest by the eligible voters, popularity among eligible voters, and/or geographical relevance. The listing of issues 368 includes all matters of budget, policy, legislation, etc. on which the eligible voter may desire to provide quantitative feedback to the elected official. While the eligible voters may use this portion of the accountability page to bring issues and matters of concern to the attention of their elected official, certain issues may restricted from this portion, for example, those issues concerning national security.

Figure 14:
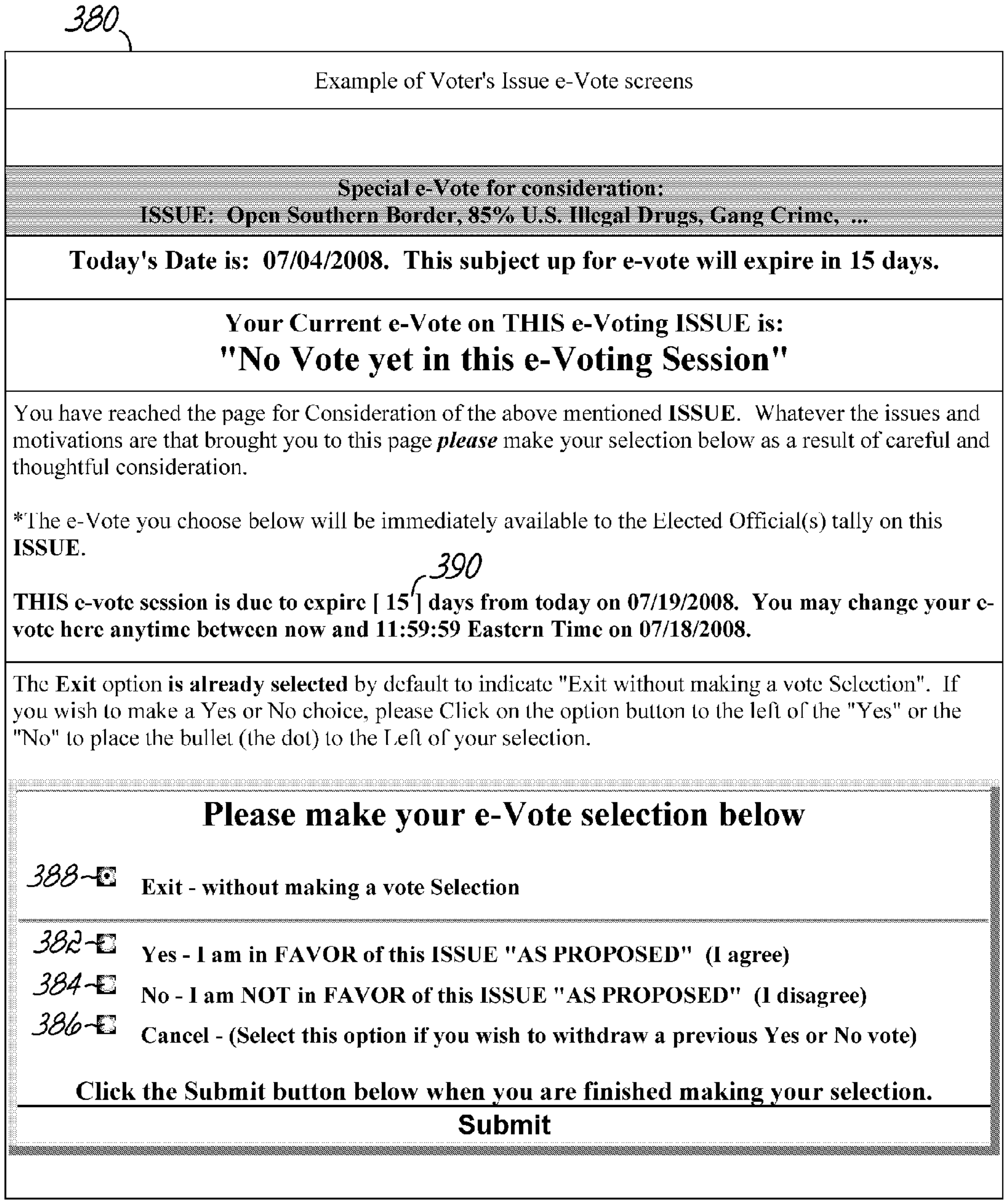
FIG. 14 is an e-Voting screen capture from the website for accessing the voter computing system of the electoral system.

As shown in FIG. 13, the columns in this section include:

Issues 370—a title for the issue under consideration;

Review Pro & Con 372—information relevant to the issue is presented in text and/or multimedia form, including the text of the bill under consideration. The APGAA may designate persons responsible for reviewing the materials linked to the Pros & Cons and removing any uninformed materials and/or biased information;

Geog 374—indicates the district covered (i.e., city, state, and federal) by the issue;

Elevate 376—optional field for a recommendation of possible appeal of the issue to an office of higher jurisdiction (i.e., from city to state); and Click to e-Vote 378—includes a hotlink that takes the eligible voter to a website or interface with the voter computing system 101 for e-voting on the particular issue, an example of an e-Voting screen is shown in FIG. 14 and is described in detail below.

Turning now to the e-Voting screen 380 where the eligible voter has an opportunity to comment or vote on a position or opinion relative to the particular issue, i.e., by the e-Vote 378 (FIG. 13). The issues may be evaluated by the eligible voters via a blog-type interface (not shown) and/or by a vote. The blog style interface may contain at least two "issues" columns: the first column for presenting the most recent entries and the second column may list the issues in order of importance or popularity among eligible voters. The e-Vote interface allows the eligible voter to select an option: to be in favor of the issue 382, to be against the issue 384, to recall or withdraw his previous vote on the issue 386, or exit 388 the voting screen 380 without voting.

Each e-Vote may include a polling period for providing an amount of time to allow the eligible voters to vote but providing a finality to the polling period, e-Vote process. The polling period includes a timer 390, such as a date and time of e-Vote expiration, in a conspicuous location on the voting screen 380. Accordingly, at the close of the polling period, the results of the vote may be reported to the APGAA, the elected office at large, the elected officials, the constituency, news agencies, or other interested entities.

Figure 15:
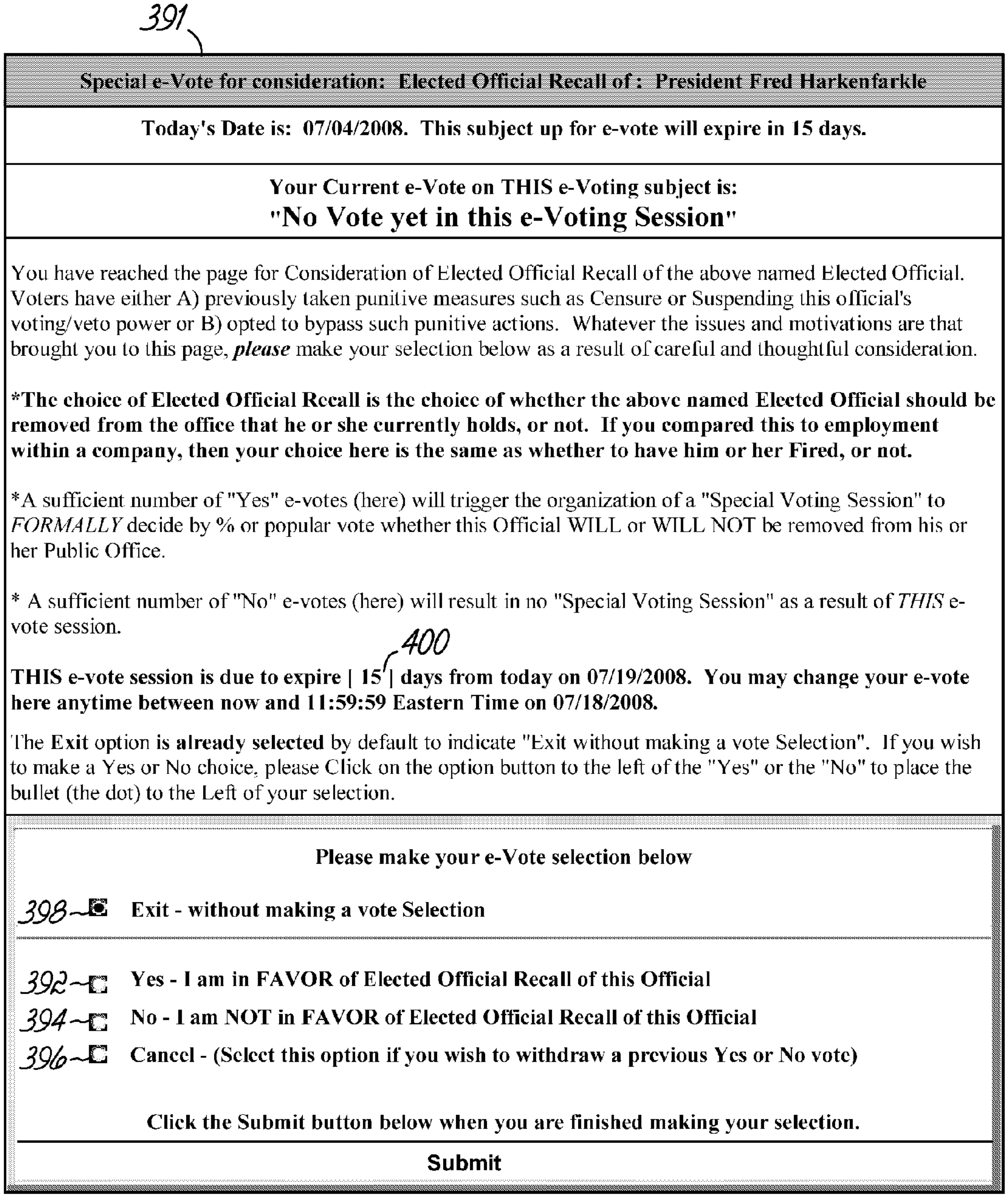
FIG. 15 is a special e-Vote consideration screen capture from the website for accessing the voter computing system of the electoral system.

FIG. 15 illustrates another example of a screen capture for a special e-Vote consideration 391 where the issue that is presented to the voter for consideration is the consideration to recall particular elected official, i.e., removed or suspended from his official duties. Generally, the recall of the elected official will only be proper if previous punitive measures have been taken against the elected official or the action is considered to be so egregious that the punitive measures option may be bypassed in favor of a direct recall of the elected official. Accordingly, the eligible voter is presented with a choice: in favor of a recall 392, not in favor of a recall 394, to recall or withdraw his previous vote on the issue 396, or exit 398 the special e-Vote consideration 391 without voting. As discussed above, a polling period, with a timer 400, provides an amount of time to vote while providing a finality to the polling period, e-Vote process.

At the end of the e-Vote process, the votes are tallied by the voter computing system 101 and reported to the constituency and the elected official.

Any elected official may sign into the website in one of two ways: (1) with his unique voter identifier as the eligible voter to opine on elected officials and issues as presented above, or (2) with the information of his elected official card in order to view his constituency's issues and confidence e-Votes and/or to present questions and issues for the vote of the eligible voters. One example of an elected official page 410, when interfacing with the voter computing system 101 via the elected official card, is shown in FIG. 16. The elected official page 410 includes eligible voters' opinions presented in a tabular format. In the illustrated example, various events and/or issues from Sep. 1, 2008 to Sep. 30, 2008 are shown for a hypothetical President Fred Harkenfarkle. The tabular format includes a variety of columns, such as:

Date 412—the time range reported; while the issues presented in FIG. 16 are for an entire month, other time ranges could be designated. For example, the elected official may wish to view a summary of the issues for a given two-week period, a one-week period, a particular day, or even a year;

% Constituency No Confidence e-Votes 414—reports the number of "No" confidence votes reported for a designated time, for example, daily;

"% Change" 416—indicates the relative change in successive e-Vote results relative to the same issue and/or event;

Most significant Issue 418—designates the issue receiving the most disapproval e-Votes by eligible voter response on the day reported; and EOR % 420—indicates "elected official recall" vote progression and reports preliminary measures of the results of a special recall e-Vote issued against President Harkenfarkle.

In viewing the hypothetical data of the illustrated example, certain features of the elected official page 410 can be seen. For example, a −1% reduction in the hypothetical % of "No" confidence e-Votes on the issue of "Border Agents Ramos & Campean Imprisoned" on Sep. 4, 2008, may indicate that President Harkenfarkle had taken measures to mitigate some negative opinion through media, propaganda, announcements, his APGAA message section, etc. However, the percentage of "No" confidence continues to rise on a particular main issue of "Evidence 'Selective Intelligence' was used to get into $2^{nd}$ war," which may be due to a hypothetical media reporter discovering additional culpable information about the Elected Official on the most significant issue and on Sep. 22, 2008.

It may also be seen that the Sep. 22, 2008 issue includes a 32% EOR rating, meaning that 32% of eligible voters are in favor of a recall of President Harkenfarkle. The EOR % continues to rise to 67% by Sep. 30, 2008. It should be noted that when the EOR % reaches the particular value (referred to above as the statistically significant majority), that the indicator, "!" will appear under SeV 366 (FIG. 13) of the accountability page 350 (FIG. 13) by President's Harkenfarkle. The presence of the indicator signifies that a statistically significant majority of the eligible voters have independently indicated a lack confidence in Present Harkenfarkle and that an opportunity for the eligible voters to take action may be presented.

While it is beneficial for the eligible voters to have the power to designate a vote of "No" confidence in the elected officials and to hold these elected officials accountable, there may be times in which the eligible voters may not be fully cognizant of all the facts, including those that are classified and/or related to the issue of national security. Accordingly, in some embodiments it may be possible for the government to override the recall of the elected official. For example, a Congressional vote by a super-majority may overcome the recall of an elected official if the issue can be shown to be related to national security interest.

As has been described with some detail, the electoral system 100 provides a manner of allowing eligible voters to have a voice regarding events and issues at all times and not just on Election Day.

Implementation

Figure 17:
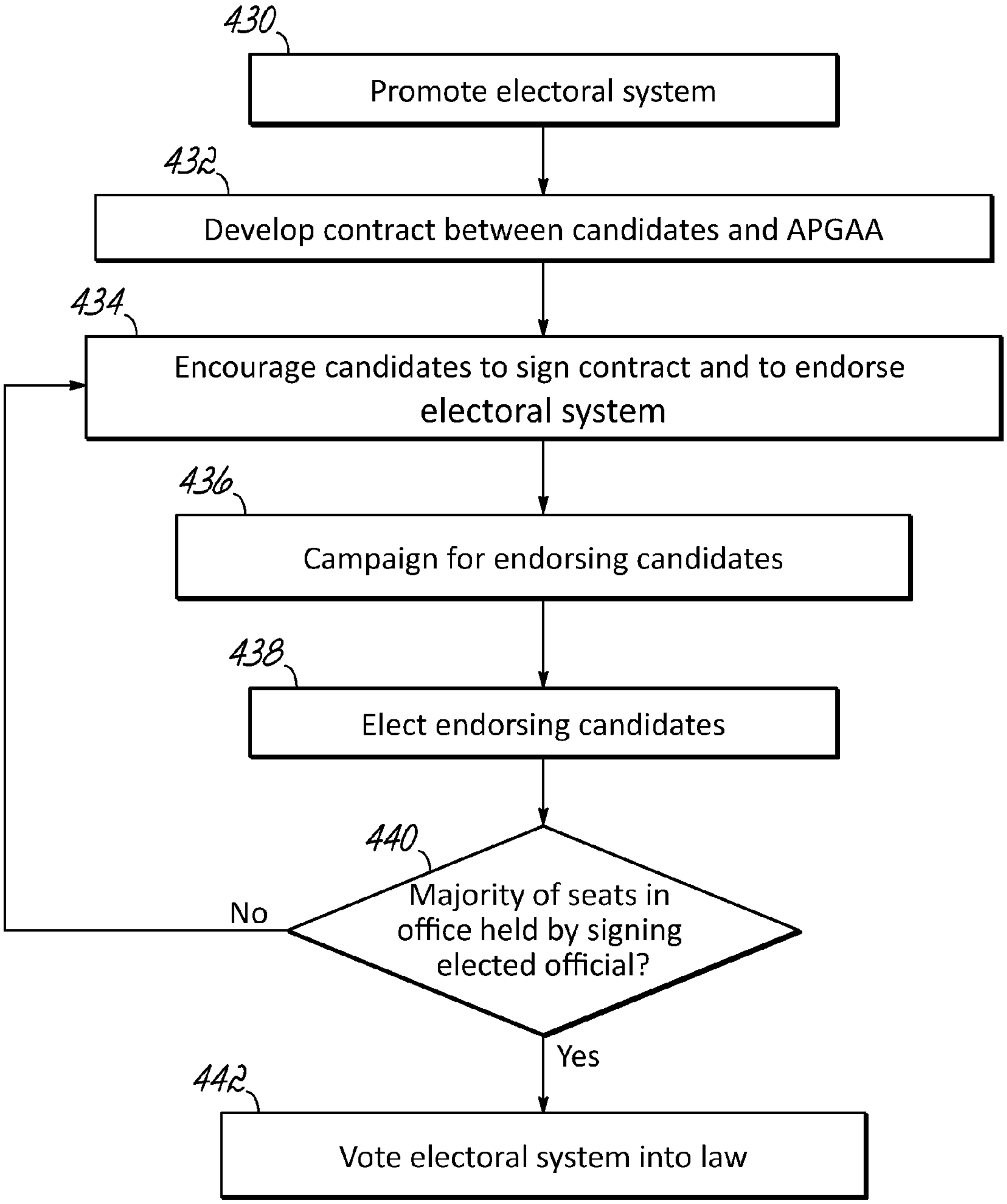
FIG. 17 is a flow chart illustrating one exemplary manner of lobbying for the enactment of a legislation directed to the electoral system.

Implementing an embodiment of the electoral system 100 may require certain exceptions to anti-trust laws, constitutional amendments, or other regulations to allow for the establishment of a Government-permitted monopoly. Those procedural issues aside, one manner of the APGAA lobbying for the enactment of legislation that would implement the use of the electoral system according to one embodiment of the invention as described herein is described with reference to FIG. 17. At Step 430, the particular benefits and features of the electoral system are promoted to the eligible voters. Promotion may occur through standard channels of commerce, advertisement, the use of propaganda, or other political activist preferred methods.

In Step 432, a contract for the benefit of the eligible voters is drafted between signing candidates for office and the APGAA, agreeing that in exchange for campaign support and/or endorsement, those signing candidates will, at the appropriate time, vote in favor of a bill that enacts legislation to the electoral system 100. Candidates for various elected offices are encouraged to sign the contract with the APGAA in exchange for their campaign endorsements in Step 434. Then, throughout the campaigns of the signing candidates, the APGAA will endorse and promote the signing candidates in Step 436 in an effort to obtain the election of those candidates to a seat within the political office in Step 438. After each Election Day, there will be an Inquiry 440 to decide whether a sufficient number of seats of the political office are occupied by the now signing elected officials (may include the elected official to the executive branch that ultimately signs the bill into law). If the APGAA decides that a sufficient number of seats are occupied, then the APGAA will encourage the elected officials to introduce the bill for the electoral system 100 to the floor and present the bill for vote in Step 442. Because the majority of seats are occupied by elected officials having signed the contract agreement, the bill is likely to be voted into law. While a simple majority may be used for the purposes of passing a bill into law, the APGAA may desire to wait until a supra-majority, veto-proof, number of seats that are occupied by the elected office that have signed the contract.

If the APGAA determines that an insufficient number of seats are occupied, then the APGAA will continue campaigning, endorsing, and/or promoting signing candidates in the next election.

This method of implementing the electoral system 100 ensures that the persons elected to office will act in accordance with the intent of the eligible voters that have elected those persons to office. Further, this will enable the eligible voters to gain some accountability over the elected officials.

1 Voter-1 Vote & Identity Theft Component

While the electoral system 100 has been described with some detail, there may be other embodiments incorporating one or more features directed to identity and security. For example, the database of the voter computing system 101 may further include a data set that is correlated to biometric data of each of the eligible voters of the first data set. The biometric data may include a finger print, a handprint, a retinal eye scan, photograph, or other identifying biometric data that may be acquired at the time of voter registration at the terminal 160 (FIG. 5). In this way, the biometric data may be used by the eligible voter to log into and interact with the voter computing system 101 instead of using the voter registration card 180 (FIG. 6).

Indeed, there may be other embodiments where the terminal 160 (FIG. 5) issues all government identification, acquires biometric data to populate the database, and distinguishes eligible voters from non-eligible residents by their biometric data. This embodiment may require additional identification verification at the time of data entry to prevent the fraudulent issue of voter registration cards 180 (FIG. 6). The additional verification may include birth certificates, social security cards, drivers' license, etc. Transmittal of the biometric data, social security number, and other identity sensitive information to the voter computing system 101 may include encryption of the data set and other known security measures.

If two or more persons register with the same or similar biometric data, social security number, or other, then the voter computing system 101 may notify the matching persons, the police, the FBI, or other authority to initiate an identity theft investigation to identify which is the legitimate party and to access the biometric data and other personally identifying information provided by the illegitimate party.

With the infrastructure in place for the identification database, the identification and biometric data may be used for commercial purposes. For example, banks and credit bureaus lend money based on investment risk that is assessed by persons' identity, credit report, and so forth. However, fraudulent actions taken by those attempting to obtain a higher credit rating and loans may ultimately affect the rates of legitimate lenders. The use of the biometric data as a point of sale identification (POSI) enables the direct correlation of consumer credit ratings and credit history with biometric data. Therefore, banks and credit bureaus may obtain the most reliable assessment of credit risks.

The commercialization aspect may further include one or more Document Verification Centers (DVC), which is an authorized institution for correlating documents with the individual's biometric data. Documents may include applications for loans, applications for accounts, applications for mortgages, applications for credit cards, and so on.

The commercialization aspect may further limit fraudulent purchases by persons not having authority to purchase goods or services with a particular debit or credit card. For example, the POSI would enable retailers to have a biometric detection system in addition to credit and/or debit card scanners. When a purchase is made, the retailer's computing system will transmit scanned biometric data, with identifying information from the credit and/or debit card, to the voter computing system 101. If the indentifying and biometric data match, then the identity of the purchaser is affirmed and the purchase transaction continues; if there is no match, then the purchaser may likely be by an unauthorized user of the debit and/or credit card and the voter computing system 101 notifies the retailer of the apparent fraudulent activity and the transaction cancelled.

In another embodiment, the biometric data may be used by law enforcement agencies to quickly and properly identify a person of interest. By quickly scanning the finger print, retina, or other biological feature, the law enforcement agency can quickly learn the name, address, and other information regarding the individual, including any outstanding warrants for arrest. For example, use of the biometric data in this way would be beneficial when the person of interest refuses to identify himself, provides a false name, is residing in the U.S. illegally, and so forth.

If it is desired that the voter computing system 101 is to remain devoid of personally identifying information, then it would be possible to correlate the data sets at the voter computing system 101 and the government computing systems 104 such as with the biometric data set so that identification may be possible but the voter record remains anonymous.

The electoral system 100 with voter computing system 101 offer many benefits over conventional manners of voting. For example, the voter computing system 101 aids the eligible voter in reviewing and verifying their prior voting history and a manner of providing feedback and opinions to elected officials every day. The voter computing system 101 further empowers the eligible voters with voting rights through e-vote, which is not limited to Election Day. A manner of limiting or suspending an elected official's rights in the elected office has been described, as well as a manner of government override of the recall process.

While the present invention has been illustrated by a description of various embodiments, and while these embodiments have been described in some detail, they are not intended to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with methods of practicing the present invention as currently known. However, the invention itself should only be defined by the appended claims.

What is claimed is:

1. A method of conducting a government accountability program by a computing system with a processing unit, a terminal including a user interface including input devices and a display and communicating with the processing unit, a database in communication with the processing unit, and a non-transitory storage medium having instructions that cause the computing system to execute the steps of the method, which comprises:

(a) correlating, by the database, a roster of voters to an electoral district and correlating, by the database, a roster of candidates to the electoral district for an election to be held in the electoral district;

(b1) receiving, by the terminal, a request from one of the voters in the electoral district to display a list of ballot issues and candidates;

(b2) displaying, by the terminal with the user interface, a list of ballot issues and candidates for the election in the electoral district;

(c) receiving, by the terminal, and tabulating, by the processing unit, votes cast at the user interface by any of the voters for the electoral district during the election;

(d1) determining, by processing unit, that the election has ended;

(d2) based on the determining, calculating, by the processing unit, a total number of votes cast for the ballot issues and the candidates for the electoral district;

(d3) reporting, by the processing unit, an updated roster of elected officials for the electoral district resulting from the election; and (e) performing, by the computing system, the following steps defining an elected official accountability process:

(e1) correlating, by the database, the roster of elected officials for the electoral district with a record of actions taken by at least one of the elected officials during representation of the electoral district;

(e2) receiving, by the terminal, a request from any of the voters of the electoral district for records of actions taken by a chosen elected official;

(e3) displaying, by the terminal with the user interface, the records of actions taken by a chosen elected official with options to approve or disapprove of the actions in the record of actions;

(e4) receiving and tabulating, by the processing unit, "No Confidence" votes for the chosen elected official based on input at the user interface from the voters of the electoral district;

(e5) initiating, by the processing unit, a special voting session for the voters of the electoral district to vote on sanctions to impose on the chosen elected official after each time that the tabulated "No Confidence" votes for the chosen elected official exceed a predetermined threshold;

(e5a) determining, by the terminal, that a first special voting session is initiated in step (e5);

(e5b) based on the determining in step (e5a), reporting, by the terminal and the user interface, that the sanctions to impose on the chosen elected official include censure of the chosen elected official and/or suspension of voting privileges of the chosen elected official;

(e5c) determining, by the terminal, that a second special voting session is initiated in step (e5)

(e5d) based on the determining in step (e5c), reporting, by the terminal and the user interface, that the sanctions to impose on the chosen elected official include recall of the chosen elected official from office;

(e6) generating, by the processor, an elected official page including a summary of total "No Confidence" votes received for the chosen elected official, percent change in the "No Confidence" votes, and issues or actions of the chosen elected official in which voters are designating the most disapproval during a time period, and displaying, by the user interface, an elected official page after a request from the chosen elected official at the user interface.

2. The method of claim 1, further comprising:

receiving, by the terminal and the user interface, information from a voter card provided to at least one of the voters in the electoral district with the user interface, the voter card having a unique ID, a unique access pin, or a user defined password, or a combination thereof; and checking, by the processing unit, whether the information from the voter card corresponds to one of the roster of voters, and preventing completion of steps (b1), (b2) and (c), by the processing unit, until the information from the voter card is identified as a valid identification of one of the roster of voters of the electoral district.

3. The method of claim 1, further comprising:

correlating, by the database, a roster of employees of an election agency to a record of an action taken by any of the employees of the election agency.

4. The method of claim 3, further comprising:

receiving, by the terminal and user interface, a command to take an action from one of the employees of the election agency, wherein the action includes entering or deleting a voter in the roster of voters for the electoral district, or updating voter data.

5. The method of claim 1, wherein step (e1) further comprises:

correlating, by the database, a roster of elected officials for the electoral district with votes cast by at least one of the elected officials during representation of the electoral district.

6. The method of claim 5, wherein step (e1) further comprises:

correlating, by the database, a roster of elected officials for the electoral district with votes cast related to a bill or a budget by at least one of the elected officials during representation of the electoral district.

7. The method of claim 5, further comprising:

receiving and tabulating, by the processing unit, an approval or a disapproval of a particular recorded action from the voters of the electoral district; and reporting, by the user interface the tabulated approval or disapproval opinions of the particular recorded action to the elected official and/or to the voters for the electoral district.

8. The method of claim 1, wherein the predetermined threshold in step (e5) is 70% of the number of voters within the electoral district.

9. The method of claim 1, wherein the operating system also performs the following step after step (e2):

displaying, by the terminal the user interface, messages or alerts from watch dog organizations that periodically report with pro/con commentary regarding the actions of the chosen elected official.

10. The method of claim 1, wherein step (e) further comprises:

reporting, by the processing unit, to a governmental entity that sanctions to be imposed on the chosen elected official include recall from office so that the governmental entity decides whether to override the recall.

11. The method of claim 1, further comprising:

(f) performing, by the computing system, the following steps defining an accountability implementation process:

(f1) tabulating information, by the processing unit, indicating whether any of the candidates correlated with the electoral district has signed a contract requiring sponsorship and support of a bill that would enact legislation pertaining to the government accountability program;

(f2) initiating endorsements of the candidates that have signed the contract requiring sponsorship and support to the voters for the electoral district;

(f3) determining, by the processing unit, whether a majority of currently elected officials have signed the contract requiring sponsorship and support; and (f4) based on the determining in step (f3), reporting, by the terminal and the user interface, a message to the currently elected officials to prompt passage of the bill that would enact legislation pertaining to the government accountability program.

12. The method of claim 1, further comprising:

receiving, by the processing unit, a request from the voter at the user interface a voter's voting record from the database;

retrieving, by the processing unit, the voter's voting record from the database; and displaying, by the user interface, the voting record for review by the voter during or after the election.

13. The method of claim 1, wherein the computing system further includes a printer for printing documents, and step (c) further comprises:

(c1) printing, by the printer, a paper summary page containing information about a voter's votes cast during the election; and (c2) printing, by the printer, a unique document identifier on the paper summary page such that the paper summary page may be retained for record-keeping and auditing purposes after the election has ended.

14. The method of claim 1, wherein step (e) further comprises:

receiving and tabulating, by the processing unit, votes from the voters of the electoral district indicating support for a new election to be held for the office of the chosen elected official.

* * * * *

UNITED STATES PATENT AND TRADEMARK OFFICE

CERTIFICATE OF CORRECTION

PATENT NO. : 8,560,381 B2
APPLICATION NO. : 13/376436
DATED : October 15, 2013
INVENTOR(S) : Robert Green et al.

It is certified that error appears in the above-identified patent and that said Letters Patent is hereby corrected as shown below:

In the Claims:

At column 19, claim number 1, line number 30, “in step (e5)” should read --in step (e5);--

At column 20, claim number 12, line number 59, “the user interface a voter’s voting” should read --the user interface, for a voter’s voting--

Signed and Sealed this
Eighteenth Day of February, 2014

Michelle K. Lee
*Deputy Director of the United States Patent and Trademark Office*